US012682268B2

(12) United States Patent
Bonderson et al.

(10) Patent No.: US 12,682,268 B2
(45) Date of Patent: Jul. 14, 2026

(54) PHYSICAL LAYOUTS OF MAJORANA-BASED QUBITS FOR IMPLEMENTATIONS OF PENTAGONAL TILINGS

(71) Applicant: Microsoft Technology Licensing, LLC, Redmond, WA (US)

(72) Inventors: Parsa Bonderson, Santa Barbara, CA (US); David Alexander Aasen, Santa Barbara, CA (US); Christina Paulsen Knapp, Goleta, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 816 days.

(21) Appl. No.: 17/896,258

(22) Filed: Aug. 26, 2022

(65) Prior Publication Data

US 2024/0119331 A1        Apr. 11, 2024

Related U.S. Application Data

(60) Provisional application No. 63/391,504, filed on Jul. 22, 2022.

(51) Int. Cl.
*G06N 10/40*        (2022.01)
*G06N 10/70*        (2022.01)

(52) U.S. Cl.
CPC ............. *G06N 10/40* (2022.01); *G06N 10/70* (2022.01)

(58) Field of Classification Search
CPC ......... G06N 10/40; G06N 10/70; G06N 10/00
See application file for complete search history.

(56) References Cited

U.S. PATENT DOCUMENTS

2018/0052806 A1*  2/2018  Hastings ................ G06N 10/70
2021/0279627 A1    9/2021  Bauer et al.
2021/0374588 A1   12/2021  Gidney et al.
2021/0382944 A1   12/2021  Li et al.

FOREIGN PATENT DOCUMENTS

WO        2019050968 A1        3/2019

OTHER PUBLICATIONS

"A Pair Measurement Surface Code on Pentagons", by Craig Gidney, Google Quantum AI, Jun. 28, 2022.*

(Continued)

*Primary Examiner* — Nha T Nguyen
(74) *Attorney, Agent, or Firm* — Ranjeev Singh; Singh Law, PLLC

(57)        ABSTRACT

Physical layouts of *Majorana*-based qubits for implementations of pentagonal tilings are described. An example quantum device comprises a set of tetrons for enabling *Majorana*-based qubits. The set of tetrons is arranged in a lattice to allow pentagonal tilings associated with the set of tetrons. The vertices of the pentagonal tilings relate to the qubits and single qubit operations, and the edges of the pentagonal tilings (connecting different vertices) relate to 2-qubit operations acting on a pair of qubits connected by a given edge. As an example, the 1-qubit Pauli measurements relate to the operations performed on the vertices associated with the pentagonal tilings and the 2-qubit measurements relate to the operations performed along the edges of the pentagonal tilings.

20 Claims, 23 Drawing Sheets

(56) References Cited

OTHER PUBLICATIONS

Qin, et al., "Agriculture Knowledge Graph Construction and Application," Journal of Physics Conference Series, vol. 1756, Issue No. 1, Feb. 6, 2021, 09 Pages.

Bonderson, et al., "Measurement-Only Topological Quantum Computation", In Repository of arXiv:0802.0279v2, Aug. 15, 2008, 5 Pages.

Cleland, A.N., "An Introduction to the Surface Code", In Submission of SciPost Physics Lecture Notes, Mar. 22, 2022, 70 Pages.

Gidney, Craig, "A Pair Measurement Surface Code on Pentagons", In Repository of arXiv:2206.12780v1, Jun. 26, 2022, 16 Pages.

Paetznick, et al., "Performance of Planar Floquet Codes with Majorana-based Qubits", In Repository of arXiv:2202.11829v1, Feb. 23, 2022, 20 Pages.

Tran, et al., "Optimizing Clifford Gate Generation for Measurement-Only Topological Quantum Computation with Majorana Zero Modes", In Repository of arXiv:1909.03002v4, Mar. 27, 2020, 72 Pages.

"Cairo Pentagonal Tiling", Retrieved from: https://en.wikipedia.org/w/index.php?title=Cairo_pentagonal_tiling&oldid=1028437942, Jun. 14, 2021, 9 Pages.

"Topological Quantum Computer", Retrieved from: https://en.wikipedia.org/w/index.php?title=Topological_quantum_computer&oldid=999790490, Jan. 11, 2021, 7 Pages.

Jahn, et al., "Majorana Dimers and Holographic Quantum Error-Correcting Codes", In Journal of Physical Review Research, vol. 1, Issue 3, Nov. 6, 2019, 39 Pages.

"International Search Report and Written Opinion Issued in PCT Application No. PCT/US2023/022527", Mailed Date: Jul. 26, 2023, 16 Pages.

Communication under Rule 71(3) EPC Received for European Application No. 23732256.5, mailed on Mar. 4, 2026, 6 pages.

Decision to grant a European patent pursuant to Article 97(1) received for European Application No. 23732256.5 mailed on May 29, 2026, 2 pages.

* cited by examiner

100

200

300

400

600

700

800

900

1100

1600

1800

1900

PHYSICAL LAYOUTS OF MAJORANA-BASED QUBITS FOR IMPLEMENTATIONS OF PENTAGONAL TILINGS

CROSS-REFERENCE TO A RELATED APPLICATION

This application claims the benefit of U.S. Provisional Application No. 63/391,504, filed Jul. 22, 2022, titled "PHYSICAL LAYOUTS OF *MAJORANA*-BASED QUBITS FOR IMPLEMENTATIONS OF PENTAGONAL TILINGS," the entire contents of which are hereby incorporated herein by reference.

BACKGROUND

Scalable quantum systems built using topological qubits, despite protection from the topological nature of the qubits, require error correction. While surface codes have been proposed for error correction, the implementation of the surface codes in the context of scalable quantum systems remains challenging. Some of these challenges stem from the difficulties associated with performing stabilizer measurements for implementing the surface codes.

SUMMARY

Layouts of *Majorana*-based qubits (tetrons) designed to enable the implementation of error correcting codes on pentagonal tilings using 1-qubit and 2-qubit measurements are described. Such layouts enable an implementation of the surface code on pentagonal tilings. The implementation of the surface code on pentagonal tilings on such layouts requires fewer time steps, and thus less overhead and higher error threshold than previous proposals for implementing the surface code on *Majorana*-based qubits.

The present disclosure includes the description of two layouts and possible variations: one on a Cairo pentagonal tiling and one on a "brick-walled" pentagonal tiling. These layouts enable measurement operations that may be used to implement error correcting codes, including surface codes.

In one example, the present disclosure relates to a quantum device comprising a set of tetrons for enabling *Majorana*-based qubits. The set of tetrons is arranged in a lattice to allow pentagonal tilings associated with the set of tetrons. The vertices of the pentagonal tilings relate to the qubits and single qubit operations, and the edges of the pentagonal tilings (connecting different vertices) relate to 2-qubit operations acting on a pair of qubits connected by a given edge. As an example, the 1-qubit Pauli measurements relate to the operations performed on the vertices associated with the pentagonal tilings and the 2-qubit measurements relate to the operations performed along the edges of the pentagonal tilings.

In another example, the present disclosure relates to a quantum device comprising a set of tetrons for enabling *Majorana*-based qubits. The set of tetrons is arranged in one of a brick-walled pentagonal lattice or a Cairo pentagonal lattice to allow pentagonal tilings associated with the set of tetrons.

In yet another example, the present disclosure relates to a method for operating a quantum device comprising a set of tetrons arranged in a lattice. The method includes assigning code steps corresponding to a surface code to pentagonal tilings associated with the set of tetrons.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

The present disclosure is illustrated by way of example and is not limited by the accompanying figures, in which like references indicate similar elements. Elements in the figures are illustrated for simplicity and clarity and have not necessarily been drawn to scale.

DETAILED DESCRIPTION

Figure 1:
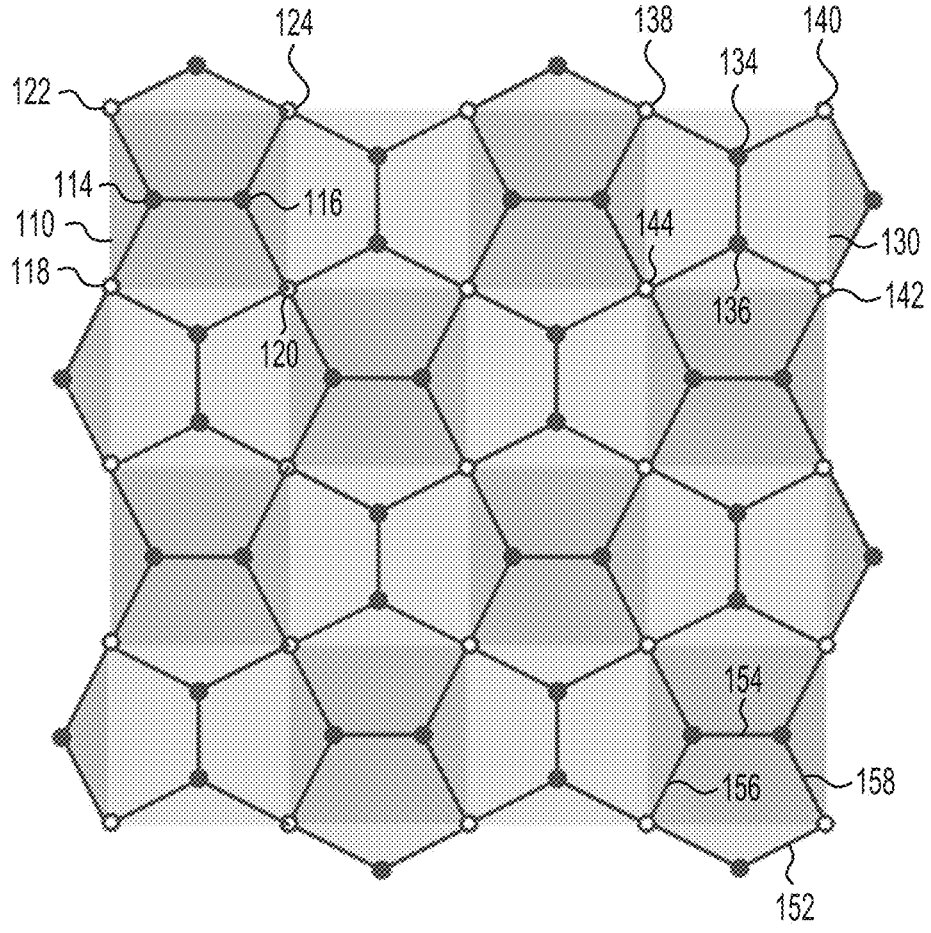
FIG. 1 shows a conceptual layout of a Cairo pentagonal lattice having data qubits and auxiliary qubits arranged in a checkerboard pattern of plaquettes in accordance with one example.

*Majorana*-based qubits encode quantum information in the degenerate ground state subspace associated with pairs of *Majorana* zero modes (MZMs). Encoding the qubit in this way protects the quantum information at a hardware level, since in a noisy environment one cannot distinguish the qubit states. Error processes on the idle qubit are exponentially suppressed in macroscopic parameter ratios of the system $$\left(\frac{L}{\xi}, \frac{\Delta}{k_B T}, \frac{E_C}{k_B T}\right),$$

corresponding to "topological protection" of the idle qubit. In this disclosure, the example tetrons are two-sided tetrons. These are charging-energy protected topological qubits.

Measurements are performed by coupling pairs of MZMs through the semiconducting regions adjacent to the qubits and/or coherent links. Each pair of MZMs defines a Pauli basis, thus coupling that pair of MZMs measures the qubit in that basis. This can be achieved by forming an interference loop through which electrons can travel coherently. Measurement loops cannot intersect; thus, the sequence of which measurements are performed at which time needs to be accounted for in the physical layout of the qubit islands. In addition, a measurement can involve a pair of MZMs from each tetron involved in the measurement. Thus, a four-MZM measurement involves two MZMs from one qubit island and two MZMs from another qubit island. During a four-MZM measurement, the 4-tuple of MZMs is being measured. As explained later, many such measurements can be simultaneously performed across the entire array of qubits supported by the physical layout of tetrons.

While in principle measurement loops can be made arbitrarily large, in practice they should be made as small as possible to reduce measurement errors. For instance, semiconductors have finite phase coherence length, thus semiconducting segments in any measurement loop must be shorter than this length to support coherent electron transport. Superconducting coherent links are used to avoid long horizontal semiconducting segments; however, the measurement visibility generally decreases as more superconducting islands are involved due to the sensitivity associated with tuning all the quantum dots and qubit islands to be in resonance with each other and balancing the interferometer arms. Moreover, as more components (e.g., quantum dots, coherent links, and qubit islands) are involved in a measurement loop, the probability of a tuning error increases, resulting in quasiparticle poisoning of the system, and the more complicated the spread of these quasiparticles can be. Error correction codes, such as surface codes, are useful for mitigating errors in the system.

A surface code on pentagonal tilings of qubits using a measurement circuit (with periodicity of 6 steps) compiled entirely from 1-qubit and 2-qubit Pauli measurements is advantageous for *Majorana*-based qubits whose native operations are 1-qubit and 2-qubit Pauli measurements. Such a system can be implemented using the architecture described herein without additional qubits or time steps. A pentagonal tiling surface code realizes a lattice of data qubits defining a checkerboard pattern of plaquettes. The present disclosure describes several layouts of *Majorana* tetron qubits for realizing pentagonal tilings in systems of *Majorana*-based qubits. In these examples, a tetron is a *Majorana*-based qubit built out of two topological wires connected by a superconducting backbone. The 1-qubit Pauli measurements relate to the measurements performed on the vertices associated with the pentagonal tilings and the 2-qubit measurements relate to the measurements performed along the edges of the pentagonal tilings. The pentagonal tilings using tetrons can be laid out using two types of lattices, as shown in FIG. 1 and FIG. 2.

FIG. 1 shows a conceptual layout of a Cairo pentagonal lattice 100 having data qubits and auxiliary qubits arranged in a checkerboard pattern of plaquettes. In this example, each plaquette uses a pair of auxiliary qubits. As part of Cairo pentagonal lattice 100 certain plaquettes (e.g., plaquette 110) correspond to surface code stabilizer XXXX and certain other plaquettes (e.g., plaquette 130) correspond to surface code stabilizer 7777. The measurements of these stabilizers can be performed in a certain sequence using quantum circuits. The data qubits are represented as hollow circles (e.g., hollow circles 118, 120, 122, 124, 138, 140, 142, and 144) and the auxiliary qubits are represented as solid circles (e.g., solid circles 114, 116, 134, and 136). In Cairo pentagonal lattice 100, the edges indicate 2-qubit measurements and the solid vertices indicate single qubit measurements. The edges (e.g., edges 152 and 154) that are horizontally slanted correspond to $M_{XX}$ measurements and the edges (e.g., edges 156 and 158) that are vertically slanted correspond to $M_{ZZ}$ measurements.

Figure 2:
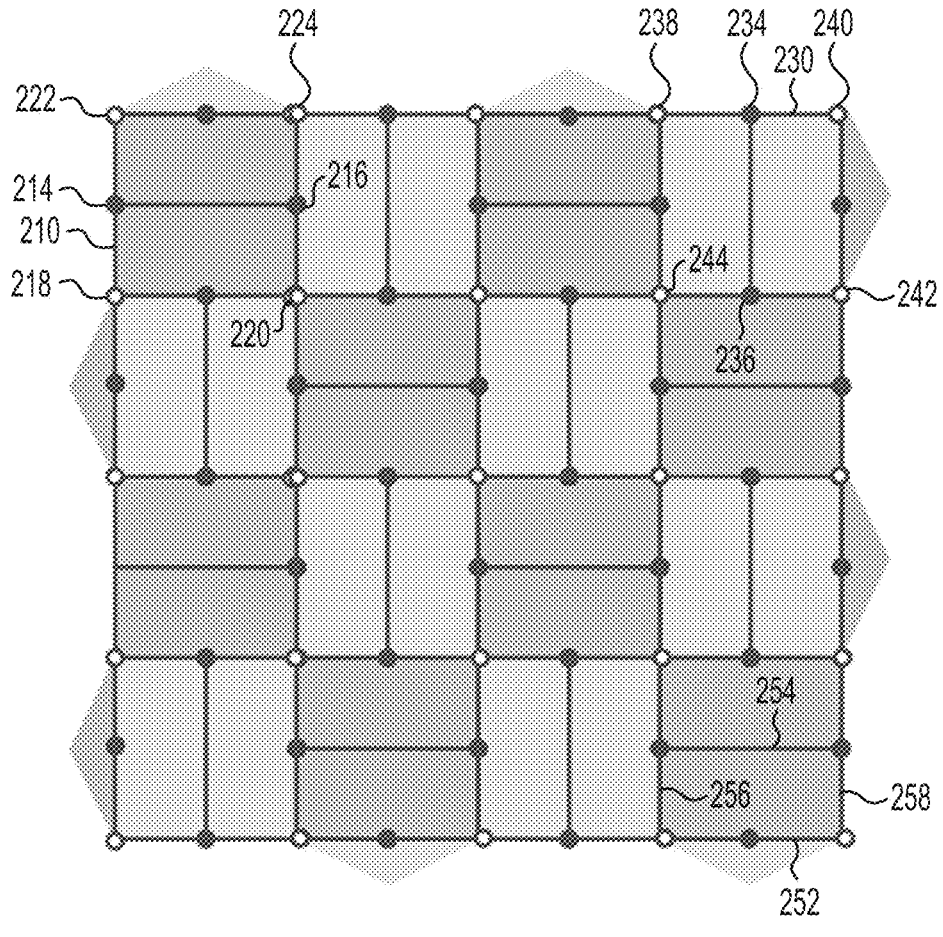
FIG. 2 shows a conceptual layout of a brick-walled pentagonal lattice having data qubits and auxiliary qubits arranged in a checkerboard pattern of plaquettes in accordance with one example.

FIG. 2 shows a conceptual layout of a brick-walled pentagonal lattice 200 having data qubits and auxiliary qubits arranged in a checkerboard pattern of plaquettes. Similar to before, in this example, each plaquette uses a pair of auxiliary qubits. As part of brick-walled pentagonal lattice 200, certain plaquettes (e.g., plaquette 210) correspond to surface code stabilizer XXXX and certain other plaquettes (e.g., plaquette 230) correspond to surface code stabilizer 7777. The measurements of these stabilizers can be performed in a certain sequence using quantum circuits. The data qubits are represented as hollow circles (e.g., hollow circles 218, 220, 222, 224, 238, 240, 242, and 244) and the auxiliary qubits are represented as solid circles (e.g., solid circles 214, 216, 234, and 236). In this example of brick-walled pentagonal lattice 200, the horizontal links indicate $M_{XX}$ measurements and the vertical links indicate $M_{ZZ}$ measurements. The solid dot vertices indicate single qubit measurements ($M_X$ for a solid dot connected to another solid dot by a horizontal link; $M_Z$ for a solid dot connected to another solid dot by a vertical link). The present disclosure uses these two lattices as a guide to produce corresponding layouts of tetrons and their measurement architectures. In addition, as described herein, the measurements for the pentagonal tiling surface code can be enabled and they can be performed using certain sequences without interfering with each other.

Figure 3:
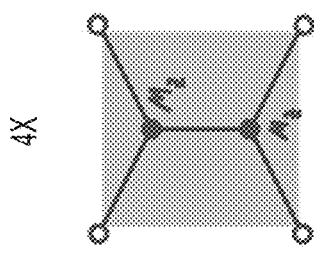
FIG. 3 shows example sequences of operations that yield the two types of stabilizer measurements associated with the lattices corresponding to FIG. 1 and FIG. 2.
Figure 3:
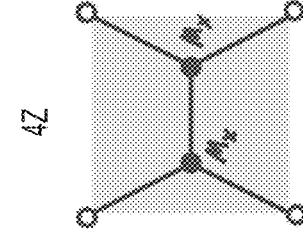
Figure 3:
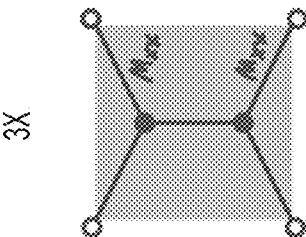
Figure 3:
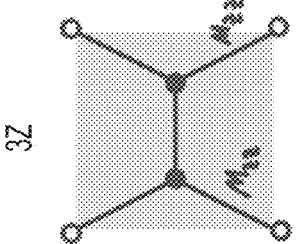
Figure 3:
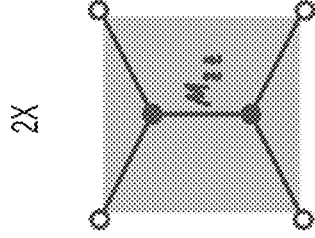
Figure 3:
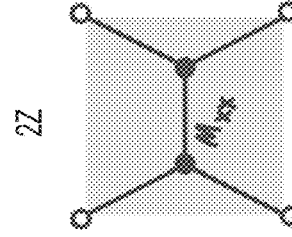
Figure 3:
Figure 3:
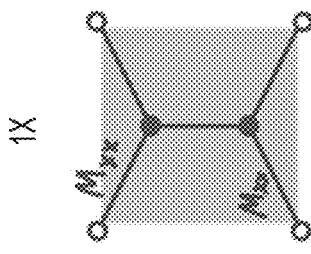
Figure 3:
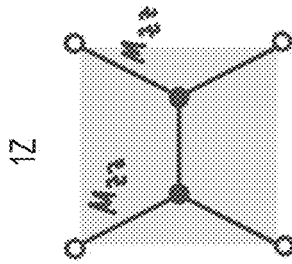
Figure 3:
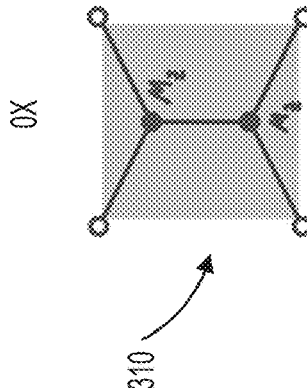
Figure 3:
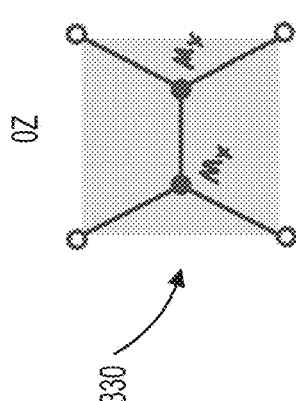

FIG. 3 shows example sequences of operations that yield the two types of stabilizer measurements associated with the lattices corresponding to FIG. 1 and FIG. 2. To lay out the code for *Majorana*-based qubits, it is beneficial to first "brickwall" the pentagonal lattice. In this figure, hollow circles again indicate data qubits, solid circles indicate auxiliary qubits, and edges indicate two-qubit measurements. The stabilizer measurements for surface code stabilizer XXXX are illustrated in row 310 and the stabilizer measurements for surface code stabilizer ZZZZ are illustrated in row 330. Single qubit X measurements on auxiliary qubits are at the end of the horizontal edges and single qubit Z measurements on auxiliary qubits are at the end of vertical edges. Measurements of these stabilizers can be compiled from a five-step sequence of 1- and 2-qubit Pauli measurements (also involving the auxiliary qubits) using a quantum circuit. The measurement pattern shown in rows 310 and 330 is repeated throughout the lattice. Note that for this basis choice, all vertical edges correspond to ZZ measurements and all horizontal measurements correspond to XX measurements. Numbers indicate in which time step each measurement is done.

While the sequences for the two types of stabilizer measurements cannot be performed simultaneously, they do not need to be performed successively. For example, the two sequences can be interleaved by off-setting their cycles by 3 time steps, which yields a combined cycle periodicity of 6 time steps. An example full implementation of the surface code (repeatedly measuring the stabilizers) interleaves the $M_{XXXX}$ and $M_{ZZZZ}$ sequences to yield the following six step period: 1=(1X, 4Z), 2=2X, 3=(3X, 0Z), 4=(4X, 1Z), 5=2Z, and 6=(0X, 3Z). This pentagonal tiling realization of the surface code has certain advantages over previous realizations of the surface code that utilize only 1-qubit and 2-qubit Pauli measurements, such as fewer steps per stabilizer measurement cycle and higher error threshold.

Figure 4:
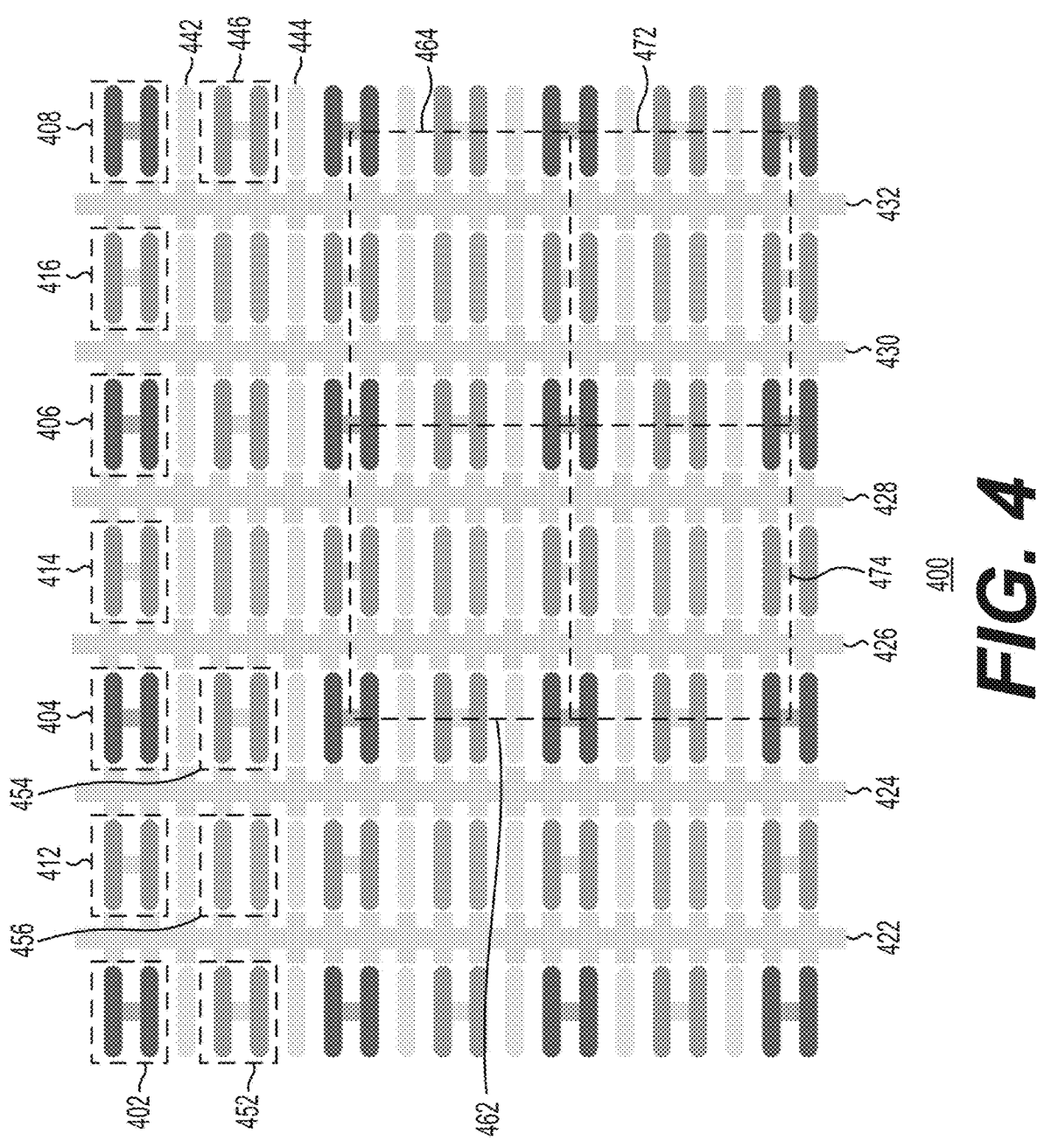
FIG. 4 shows a layout for a quantum device having tetrons for enabling *Majorana*-based qubits where the tetrons are arranged in a brick-walled pentagonal lattice.

FIG. 4 shows a layout for a quantum device having tetrons for enabling *Majorana*-based qubits where the tetrons are arranged in a brick-walled pentagonal lattice 400. Brick-walled pentagonal lattice 400 shows the quantum device including tetrons for enabling both *Majorana*-based data qubits and *Majorana*-based auxiliary qubits. As an example, in the top row of the brick-walled pentagonal lattice 400, tetrons 402, 404, 406, and 408 are configured to enable *Majorana*-based data qubits. Also, in the top row of the brick-walled pentagonal lattice 400, tetrons 412, 414, and 416 are configured to enable *Majorana*-based auxiliary qubits. Other rows of the lattice include additional tetrons that are configured to enable *Majorana*-based qubits, as well. Semiconductor regions are used to connect different qubits for the measurements associated with the sequence described earlier with respect to FIG. 3. In this example brick-walled pentagonal lattice 400 associated with a quantum device, semiconductor regions 422, 424, 426, 428, 430, and 432 may be used to connect the various qubits. As noted earlier, a tetron is a *Majorana*-based qubit built out of two topological wires connected by a superconducting backbone. Each tetron may support four *Majorana* zero modes (MZMs) with a pair of MZMs supported by one topological wire and another pair of MZMs supported by the other topological wire. In one example, gates (not shown) may be used to create one or more quantum dots for coupling the MZMs located on ends of topological wires. As explained further, in certain instances (e.g., MZMs associated with different tetrons and not directly coupled via a semiconducting region), the coupling between MZMs for the measurement operations will require additional structures. In general, the coupling between MZMs may be achieved using tunable junctions controlled using electrostatic gates that may affect certain semiconductor regions.

With continued reference to FIG. 4, the brick-walled pentagonal lattice 400 may include additional structures, including coherent links (e.g., coherent links 442 and 444). In this example, coherent link 442 may facilitate a measurement between one or more data qubits enabled by tetron 408 and one or more auxiliary qubits enabled by tetron 446. The pair of coherent links 456 may facilitate the XX measurements between auxiliary qubits enabled by tetrons 452 and 454. FIG. 4 further shows four plaquettes 462, 464, 472, and 474 (delineated by dotted boxes) corresponding to the pentagonal tilings overlapped on the layout of quantum device 400. In this example, plaquettes 462 and 472 correspond to the XXXX stabilizers and plaquettes 464 and 474 correspond to the ZZZZ stabilizers. Although FIG. 4 shows brick-walled pentagonal lattice 400 as including a certain number of components that are arranged in a certain manner, the lattice may include additional or fewer components that are arranged differently. As an example, as part of the brick-walled pentagonal lattice 400 shown in FIG. 4, the pairs of coherent links used to facilitate XX measurements between auxiliary qubits are not required for the plaquettes corresponding to the XXXX stabilizers (e.g., plaquettes 462 and 472). Thus, these pairs of coherent links at the centers of the plaquettes corresponding to XXXX stabilizers may be removed from this design. In addition, certain other coherent links (e.g., coherent links 442, 444, and similar such coherent links) are optional, in the sense that they are not required for the pentagonal surface code operations, but are needed to allow simultaneous characterization of all tetron qubits in the system. In sum, variations of the design for the brick-walled pentagonal lattice 400 could remove a subset or all of the optional coherent links, a benefit of which would be a reduction of the vertical distances (and hence errors) of certain measurement loops through semiconductor segments.

Figure 5A:
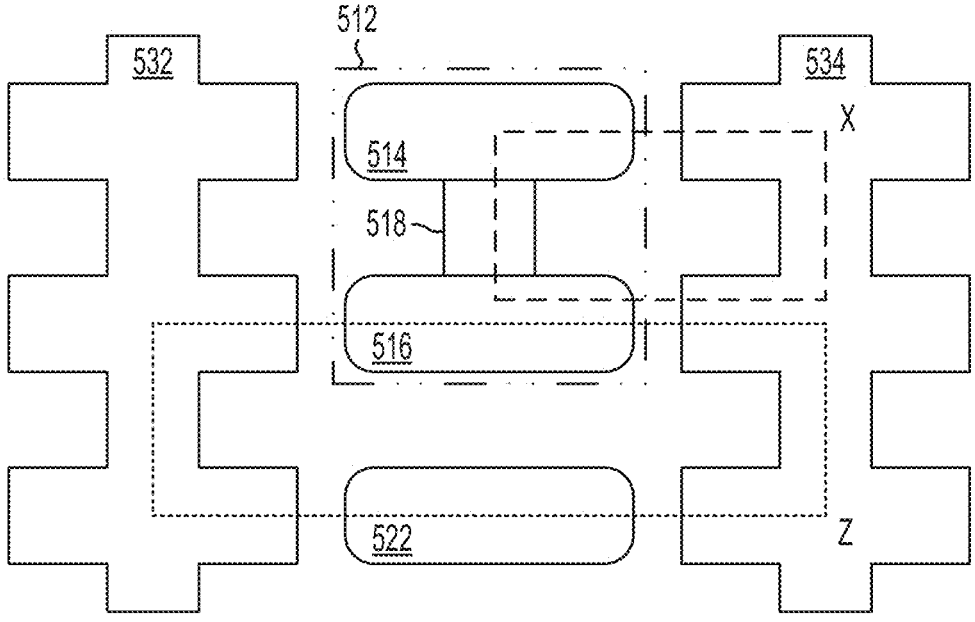
FIGS. 5A, 5B, and 5C show example qubit measurements associated with the brick-walled pentagonal lattice of FIG. 4.
Figure 5B:
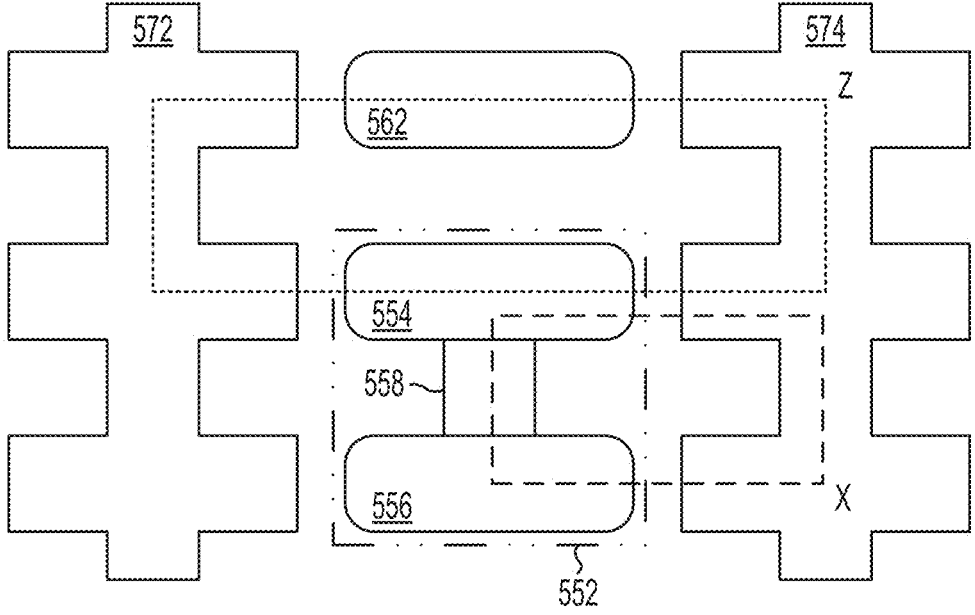
Figure 5C:
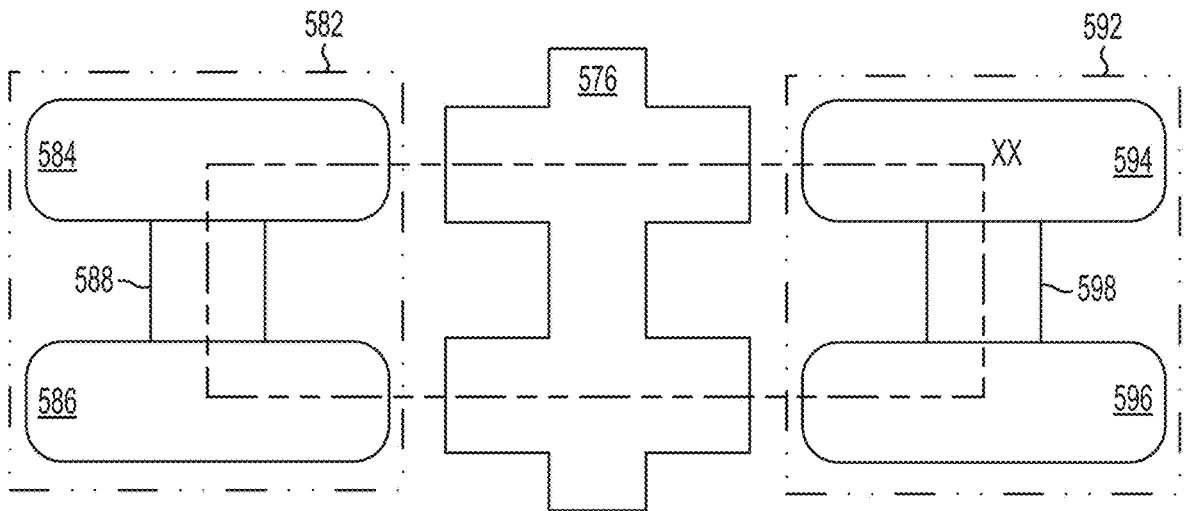

FIGS. 5A, 5B, and 5C show example qubit measurements associated with the brick-walled pentagonal lattice 400 of FIG. 4. FIG. 5A shows a tetron 512 for enabling a qubit. The MZMs for this qubit are on the end of two different topological wires (topological wire 514 and topological wire 516) connected via a superconducting backbone 518. The measurement is accomplished using a measurement loop (labeled as X), which extends through a portion of the semiconductor region 534. FIG. 5A shows another measurement that is accomplished using a measurement loop (labeled as Z), which extends through a coherent link 522, through a portion of semiconductor region 532, and a portion of semiconductor region 534. FIG. 5B shows a tetron 552 for enabling a qubit. The MZMs for this qubit are on the end of two different topological wires (topological wire 554 and topological wire 556) connected via a superconducting backbone 558. The measurement is accomplished using a measurement loop (labeled as X), which extends through a portion of the semiconductor region 574.

FIG. 5B shows another measurement that is accomplished using a measurement loop (labeled as Z), which extends through a coherent link 562, through a portion of semiconductor region 572, and a portion of semiconductor region 574. Although FIGS. 5A and 5B show both X and Z measurement loops, at a given time only one of the loops is enabled since these measurements cannot intersect. As explained later, these measurements are performed across the brick-walled pentagonal lattice of tetrons in a manner to prevent such intersection between measurement loops during a given step in the operation sequences.

FIG. 5C shows tetrons 582 and 592 for enabling a pair of qubits. Two MZMs for one of the qubits are on the end of two different topological wires (topological wire 584 and topological wire 586) connected via a superconducting backbone 588. Two MZMs for the other one of the qubits are on the end of two different topological wires (topological wire 594 and topological wire 596) connected via a superconducting backbone 598. A 2-qubit Pauli basis measurement is accomplished using a measurement loop (labeled XX), which extends through portions of tetrons 582 and 584 and a portion of a semiconductor region 576. Although FIGS. 5A, 5B, and 5C show certain examples of measurements, other measurements are possible, and could be advantageous for certain purposes.

Figure 6:
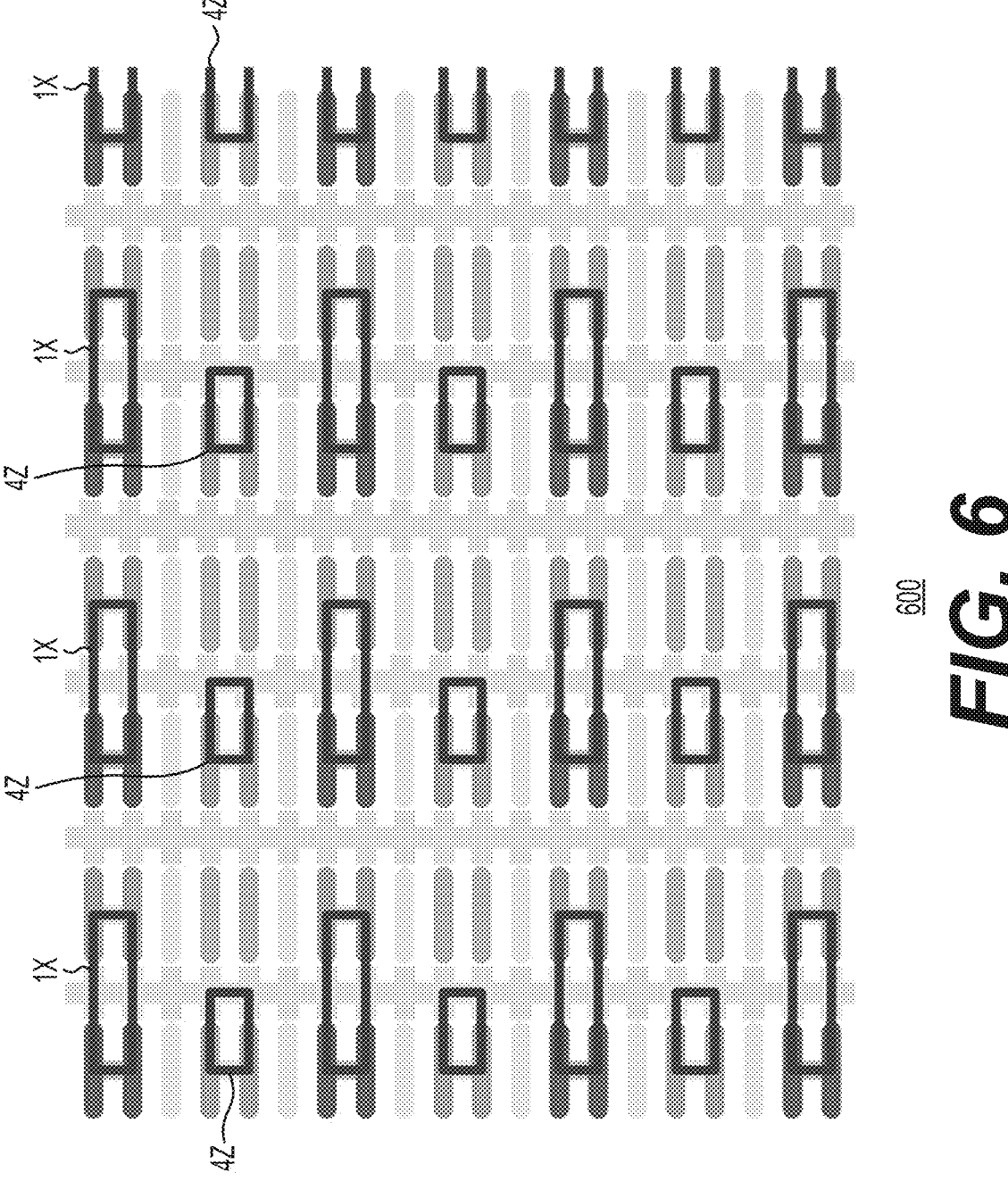
FIG. 6 is a view of the performance of step one (1X, 4Z) of the sequence of measurements associated with an error correction code using the brick-walled pentagonal lattice of FIG. 4 in accordance with one example.
Figure 7:
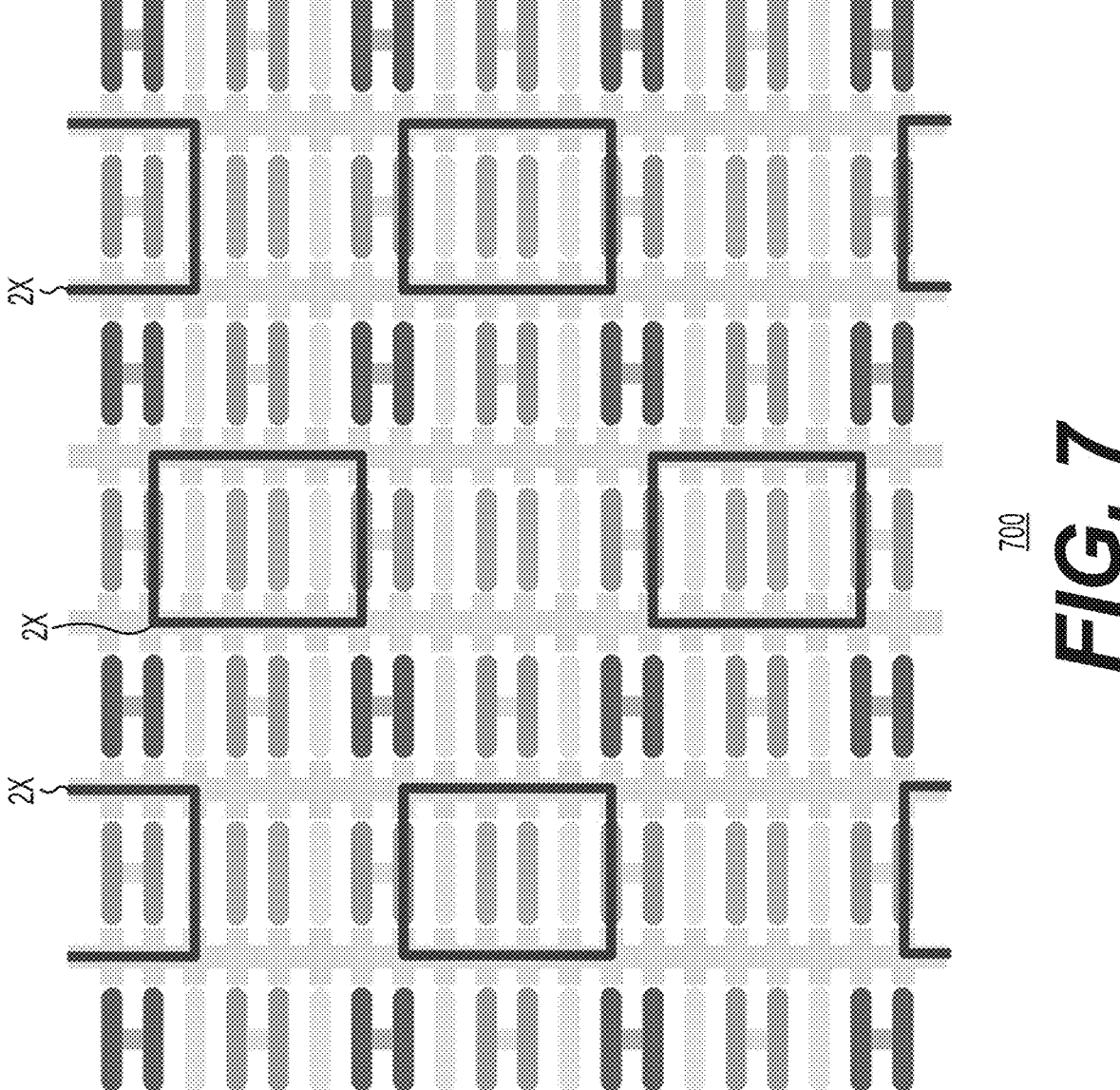
FIG. 7 is a view of the performance of step two (2X) of the sequence of measurements associated with an error correction code using the brick-walled pentagonal lattice of FIG. 4 in accordance with one example.
Figure 8:
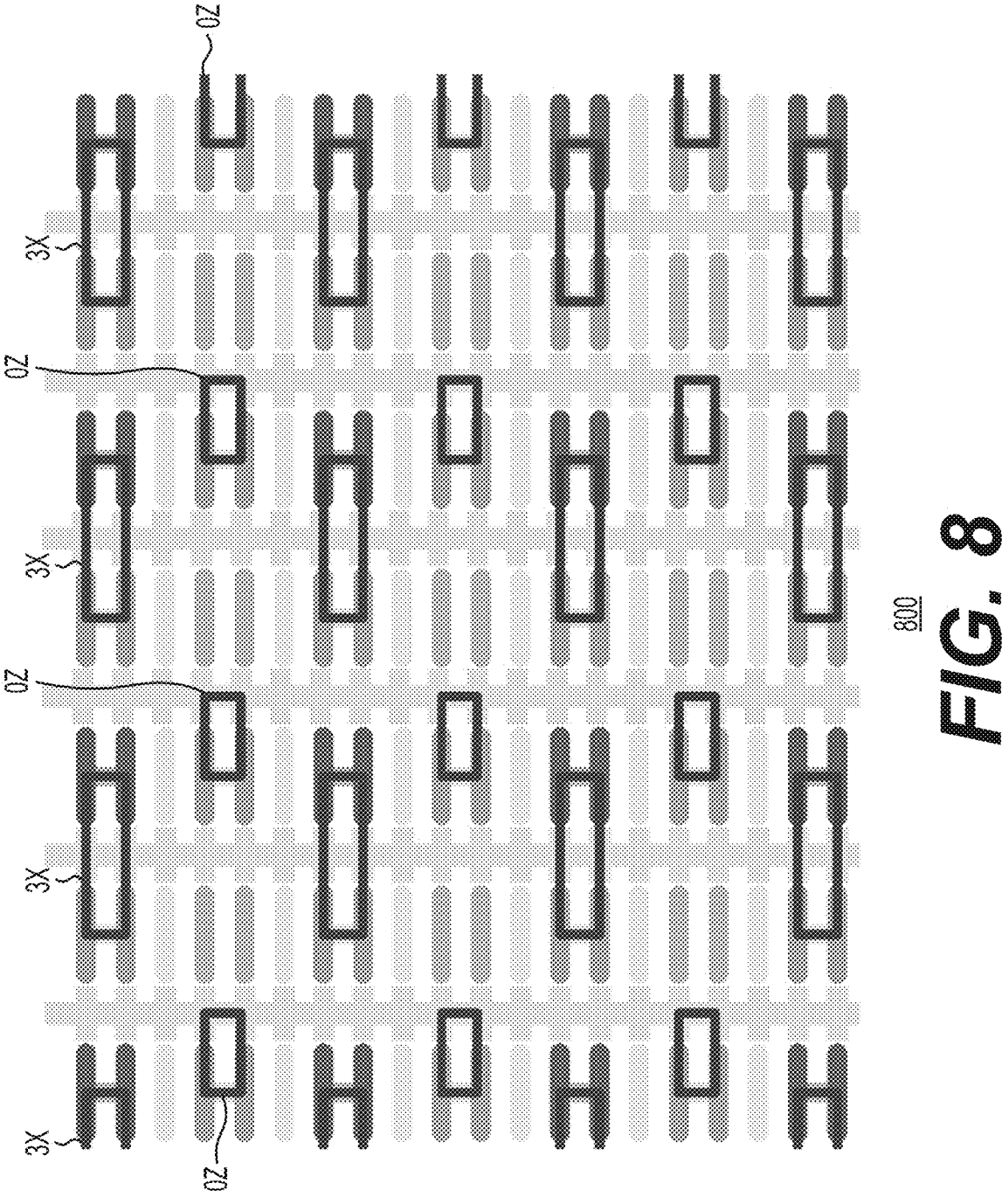
FIG. 8 is a view of the performance of step three (3X, 0Z) of the sequence of measurements associated with an error correction code using the brick-walled pentagonal lattice of FIG. 4 in accordance with one example.

FIGS. 6-11 illustrate the assignment and performance of six steps in the sequence of measurements for implementing the pentagonal surface code in the example brick-walled pentagonal lattice 400 of FIG. 4. As noted earlier, an example of a full implementation of the surface code (repeatedly measuring the stabilizers) interleaves the $M_{XXXX}$ and $M_{ZZZZ}$ sequences to yield the following six step period: $1=(1X, 4Z), 2=2X, 3=(3X, 0Z), 4=(4X, 1Z), 5=2Z$, and $6=(0X, 3Z)$. FIG. 6 is a view 600 of the performance of step one (1X, 4Z) of the sequence of measurements associated with an error correction code using the brick-walled pentagonal lattice 400 of FIG. 4 in accordance with one example. In this example, the 1X measurement is applied across the lattice in parallel as shown in the top row of view 600. At the same time, in an interleaved fashion, the 4Z measurement is applied across the lattice in parallel as shown in the second row of view 600 below the top row of view 600. FIG. 7 is a view 700 of the performance of step two (2X) of the sequence of measurements associated with an error correction code using the brick-walled pentagonal lattice 400 of FIG. 4 in accordance with one example. In this example, the 2X measurement is applied across all rows in the lattice in parallel as shown in the top row of view 700 and the second row of the top row view 700. FIG. 8 is a view 800 of the performance of step three (3X, 0Z) of the sequence of measurements associated with an error correction code using the brick-walled pentagonal lattice 400 of FIG. 4 in accordance with one example. In this example, the 3X measurement is applied across the lattice in parallel as shown in the top row of view 800. At the same time, in an interleaved fashion, the 0Z measurement is applied across the lattice in parallel as shown in the second row of view 800 below the row of view 800.

Figure 9:
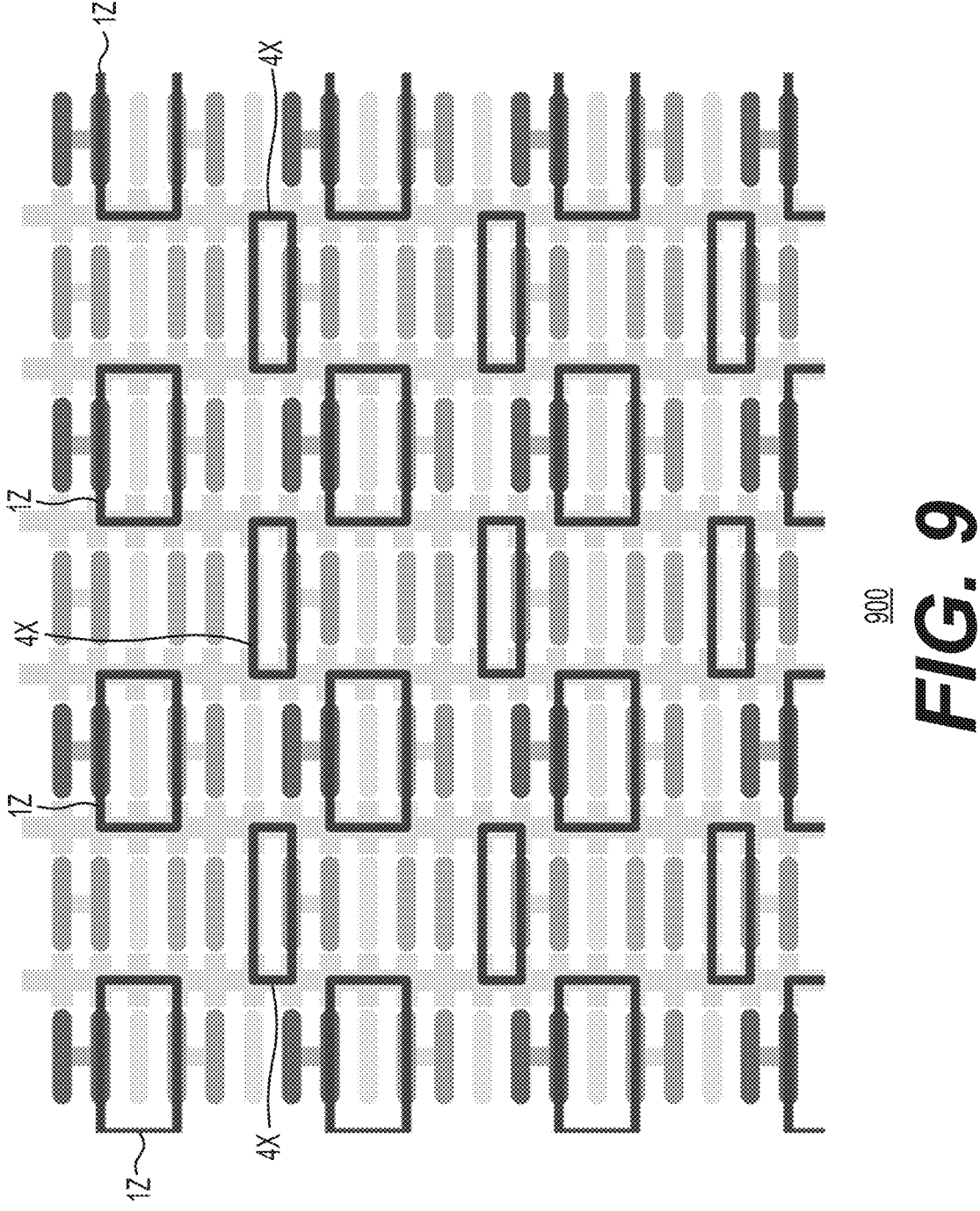
FIG. 9 is a view of the performance of step four (4X, 1Z) of the sequence of measurements associated with an error correction code using the brick-walled pentagonal lattice of FIG. 4 in accordance with one example.
Figure 10:
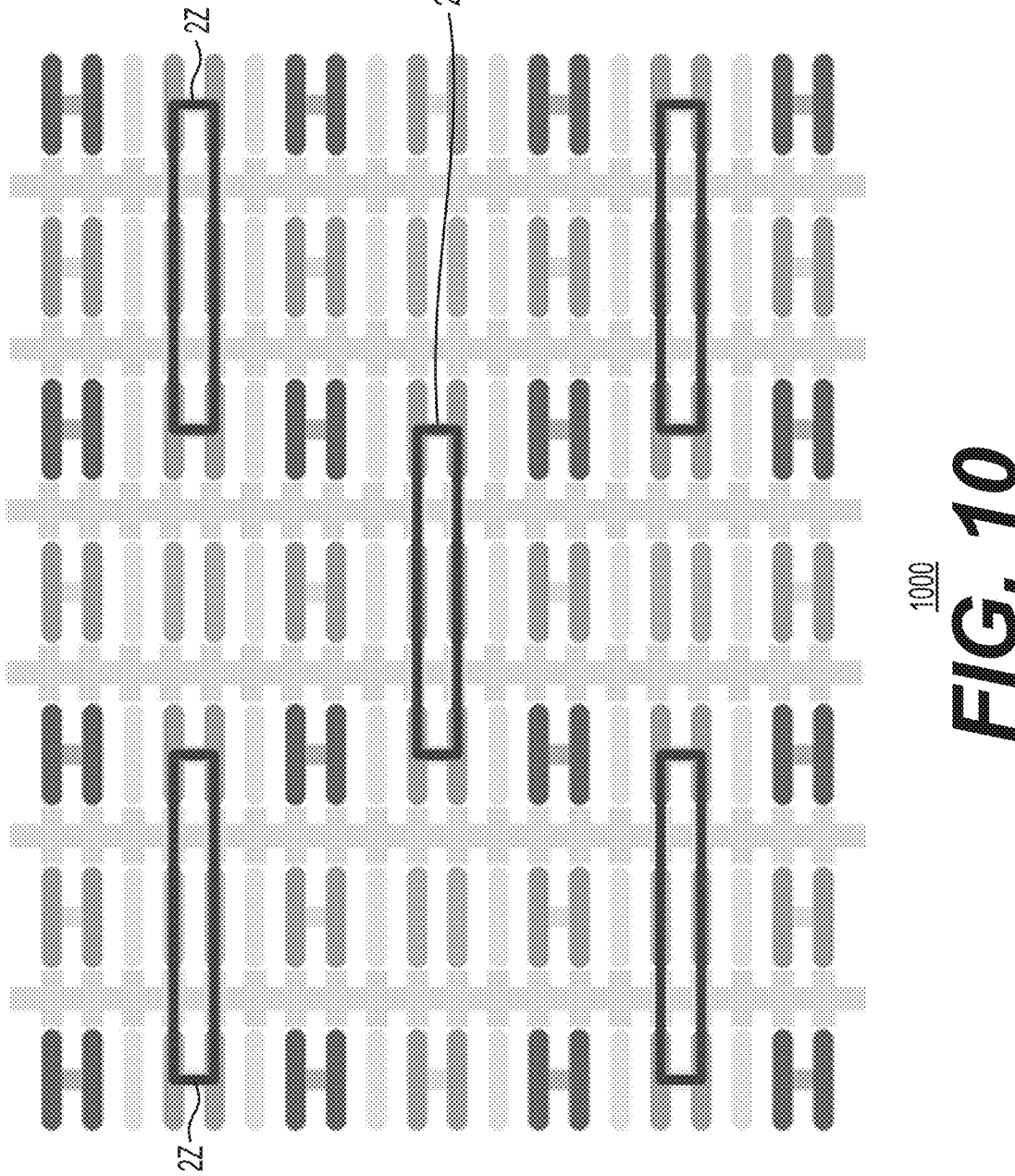
FIG. 10 is a view of the performance of step five (2Z) of the sequence of measurements associated with an error correction code using the brick-walled pentagonal lattice of FIG. 4 in accordance with one example.
Figure 11:
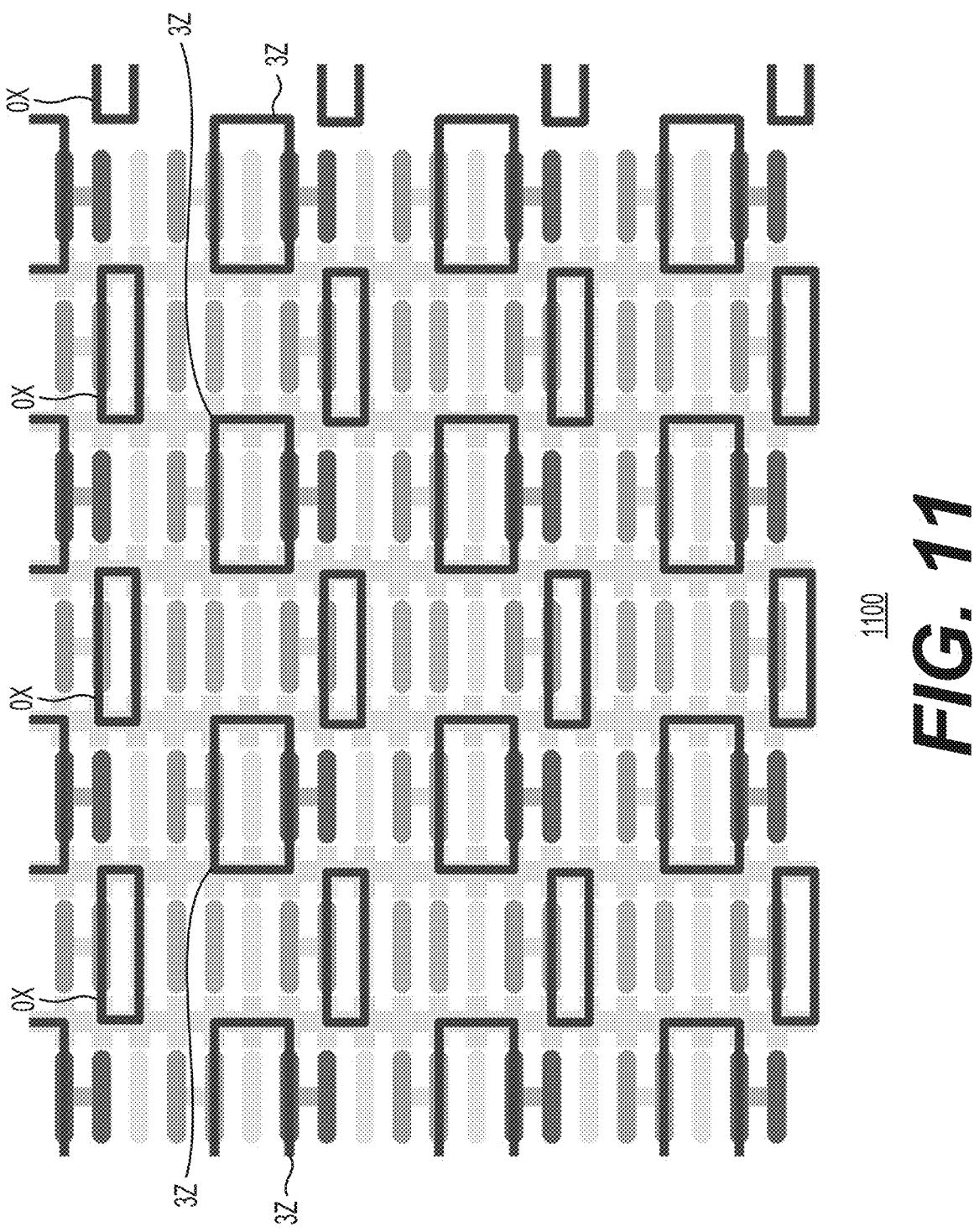
FIG. 11 is a view of the performance of step six (0X, 3Z) of the sequence of measurements associated with an error correction code using the brick-walled pentagonal lattice of FIG. 4 in accordance with one example.

FIG. 9 is a view 900 of the performance of step four (4X, 1Z) of the sequence of measurements associated with an error correction code using the brick-walled pentagonal lattice 400 of FIG. 4 in accordance with one example. In this example, the 1Z measurement is applied across the lattice in parallel as shown in the top row of view 900. At the same time, in an interleaved fashion, the 4X measurement is applied across the lattice in parallel as shown in the second row of view 900 below the top row of view 900. FIG. 10 is a view 1000 of the performance of step five (2Z) of the sequence of measurements associated with an error correction code using the brick-walled pentagonal lattice 400 of FIG. 4 in accordance with one example. In this example, the 2Z measurement is applied across all rows in the lattice in parallel as shown in the top row of view 1000 and the second row of view 1000 below the top row of view 1000. FIG. 11 is a view 1100 of the performance of step six (0X, 3Z) of the sequence of measurements associated with an error correction code using the brick-walled pentagonal lattice 400 of FIG. 4 in accordance with one example. In this example, the 0X measurement is applied across the lattice in parallel as shown in the top row of view 1100. At the same time, in an interleaved fashion, the 3Z measurement is applied across the lattice in parallel as shown in the second row of view 1100 below the row of view 1100. The six step period corresponding to the application of the error correcting code to layout 400 of FIG. 4 is repeated again and again until other operations, such as logical operations, need to be performed. The output of the error correcting codes is provided to a decoder that can be used to detect and correct the detected errors. Although FIGS. 6-11 show the performance of six steps in the sequence of measurements in a certain manner, these steps could be performed in a different manner. As an example, instead of interleaving X and Z measurements in the manner shown in FIGS. 6-11, the steps may be interleaved in a different manner.

There are several benefits of using the example brick-walled pentagonal lattice 400 shown in FIG. 4 to implement the surface code as shown with respect to FIGS. 6-11. Such benefits include: (1) all 2-qubit measurements between nearest-neighbor qubits in the lattice are short-distance, in the sense that they do not require coherent links or long semiconductor paths; (2) the measurement circuit is such that the layout only requires a single semiconductor column between each column of qubits, this simplifies fabrication of the qubit chip and reduces the numbers of quantum dots that need to be connected for measurement; (3) tetrons have larger charging energies than hexon qubits, and thus a layout using only tetron qubits is better protected from extrinsic quasiparticle poisoning; and (4) the physical qubit island layout does not hard-code any boundary conditions, making this layout naturally suited to implementing lattice surgery for logical operations. Although there are several benefits of the example layout, the vertical ZZ measurements between auxiliary qubit islands in step two of the sequence may require long-distance semiconductor connections and the horizontal XX measurements between auxiliary qubit islands in step five may require two coherent links.

Figure 12:
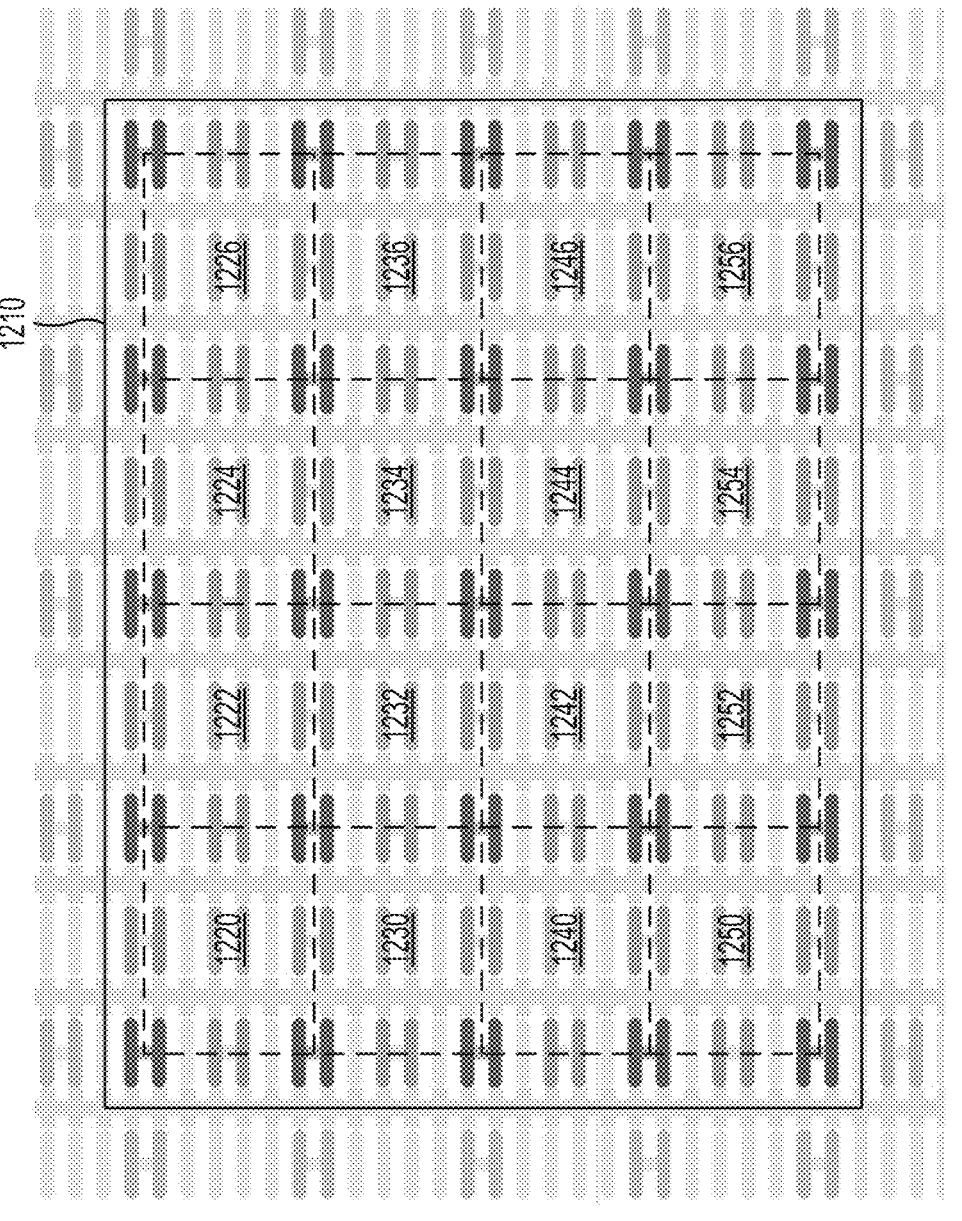
FIG. 12 is a view of an example choice of boundary conditions which can be used for implementing lattice surgery for logical operations.

FIG. 12 is a view 1200 of an example choice of boundary conditions which can be used for implementing lattice surgery for logical operations. In this example, the qubits that are outside boundary 1210 are not part of the code but the other qubits that are inside boundary 1210 are part of the code. The same measurement sequence as described earlier with respect to FIGS. 6-11 can be used with the layout shown in FIG. 12; however, any measurements involving the qubits, which are outside the code, are omitted. Thus, in this example, plaquettes 1220, 1222, 1224, 1226, 1230, 1232, 1234, 1236, 1240, 1242, 1244, 1246, 1250, 1252, 1254, and 1256 associated with the qubits within boundary 1210 are part of the sequence of measurements associated with the error correction code. The qubits supported by the tetrons outside boundary 1210 can be used for performing logical operations or other purposes. In addition, in other examples, the qubits supported by the tetrons outside boundary 1210 can be used to extend the error correction code into a larger code. The layout of the brick-walled lattice layout shown in FIG. 12 does not hardcode the size of the code patch as no additional hardware is required along the code boundaries.

Figure 13:
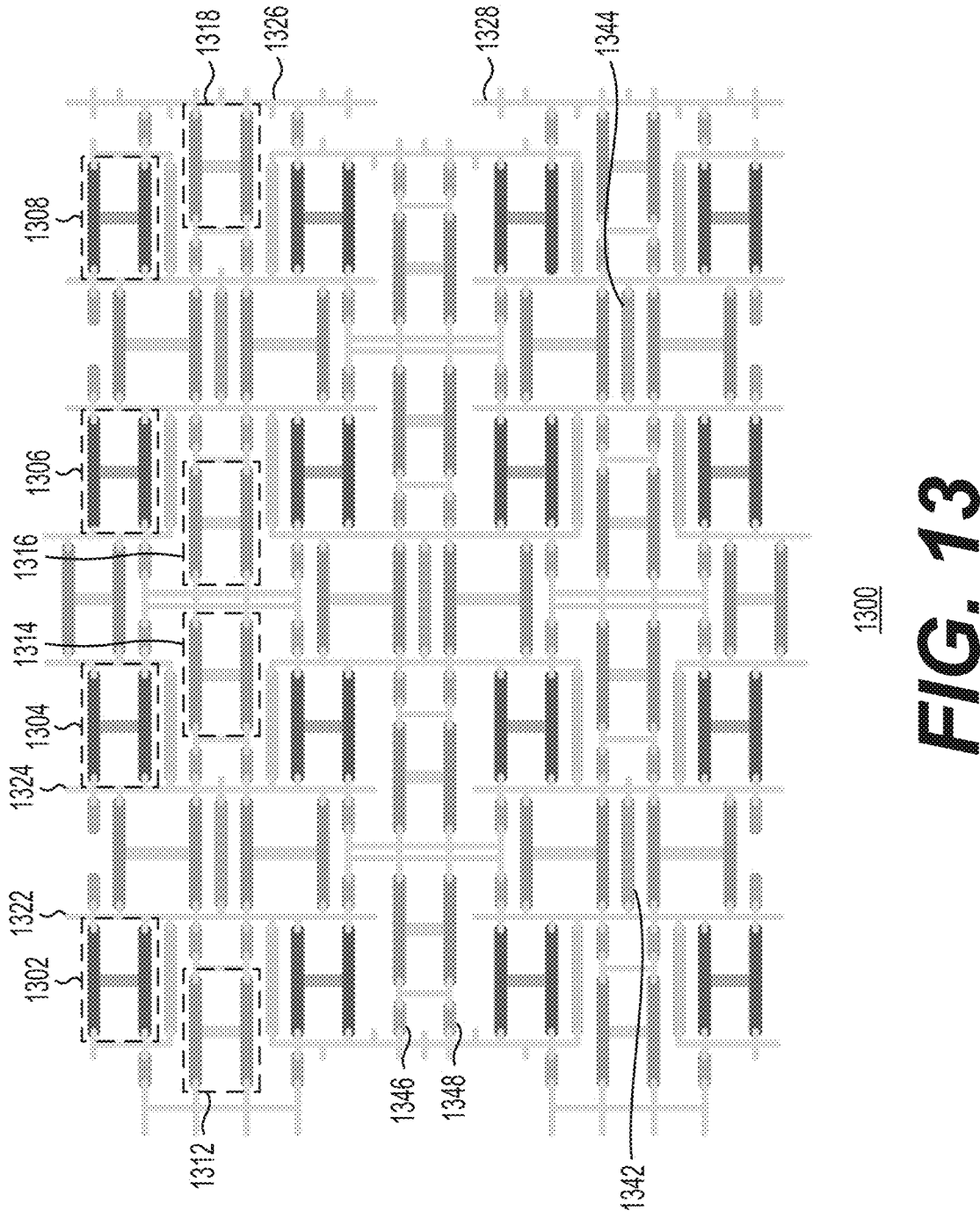
FIG. 13 shows a layout for a quantum device having tetrons for enabling *Majorana*-based qubits where the tetrons are arranged in a Cairo pentagonal lattice.

FIG. 13 shows a layout for a quantum device having tetrons for enabling *Majorana*-based qubits where the tetrons are arranged in a Cairo pentagonal lattice 1300. Cairo pentagonal lattice 1300 shows the quantum device including tetrons for enabling both *Majorana*-based data qubits and *Majorana*-based auxiliary qubits. As an example, in the top row of the Cairo pentagonal lattice 1300, tetrons 1302, 1304, 1306, and 1308 are configured to enable *Majorana*-based data qubits. In the second row below the top row of the Cairo pentagonal lattice 1300, tetrons 1312, 1314, 1316, and 1318 are configured to enable *Majorana*-based auxiliary qubits. Other rows of the lattice include additional tetrons that are configured to enable *Majorana*-based qubits, as well. Semiconductor regions are used to connect different qubits for the measurements associated with the sequence described earlier with respect to FIG. 3. In this example Cairo pentagonal lattice 1300, example semiconductor regions 1322, 1324, 1326, and 1328 may be used to connect the various qubits. As noted earlier, a tetron is a *Majorana*-based qubit built out of two topological wires connected by a superconducting backbone. Each tetron may support four *Majorana* zero modes (MZMs) with a pair of MZMs supported by one topological wire and another pair of MZMs supported by the other topological wire. In one example, gates (not shown) may be used to create one or more quantum dots for coupling the MZMs located on ends of topological wires. As explained further, in certain instances (e.g., MZMs associated with different tetrons and not directly coupled via a semiconducting region), the coupling between MZMs for the measurement operations will require additional structures. In general, the coupling between MZMs may be achieved using tunable junctions controlled using electrostatic gates that may affect certain semiconductor regions.

With continued reference to FIG. 13, the Cairo pentagonal lattice 1300 may include additional structures, including coherent links (e.g., coherent links 1342, 1344, 1346, and 1348). In this example, the coherent links come in two sizes: (1) coherent links (e.g., coherent links 1342 and 1344) that are the same length as the tetrons, and (2) "half-length" coherent links (e.g., coherent links 1346 and 1348), which are used to facilitate the ZZ measurements between certain data and auxiliary qubits. As described earlier with respect to brick-walled pentagonal lattice 400 of FIG. 4, the coherent links may facilitate a measurement between one or more data qubits enabled by a tetron and one or more auxiliary qubits enabled by another tetron. Although not shown in FIG. 13, plaquettes (similar to plaquettes 462, 464, 472, and 474 (delineated by dotted boxes) of FIG. 4) corresponding to the pentagonal tilings may correspond to the XXXX stabilizers and the ZZZZ stabilizers. Although FIG. 13 shows Cairo pentagonal lattice 1300 associated with a quantum device as including a certain number of components that are arranged in a certain manner, the Cairo pentagonal lattice 1300 may include additional or fewer components that are arranged differently. As an example, as part of Cairo pentagonal lattice 1300 shown in FIG. 13, certain coherent links are not required for the pentagonal surface code operations, but are needed to allow simultaneous characterization of all tetron qubits in the system. In sum, variations of this design could remove a subset or all of the optional coherent links, a benefit of which would be a reduction of the vertical distances (and hence errors) of certain measurement loops through semiconductor segments.

Figure 14A:
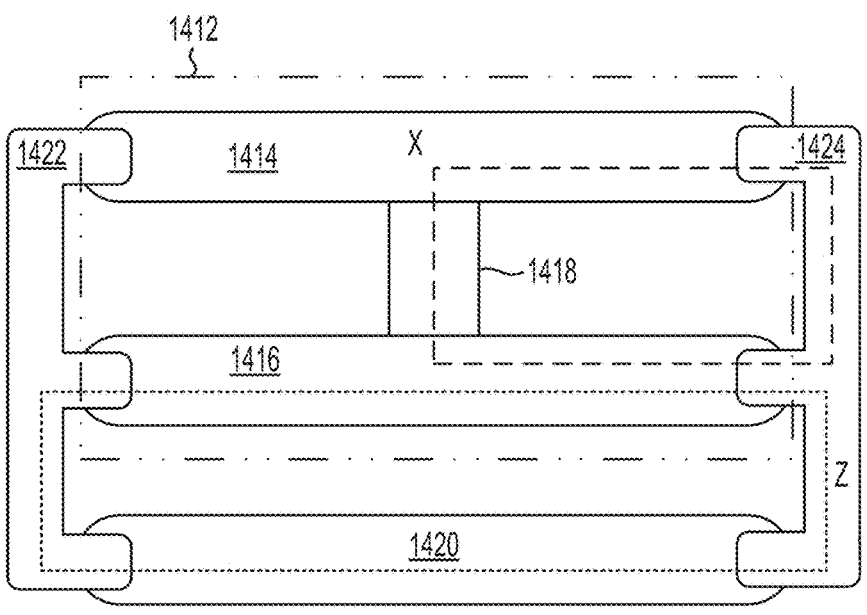
FIGS. 14A, 14B, and 14C show example qubit measurements associated with the Cairo pentagonal lattice of FIG. 13.
Figure 14B:
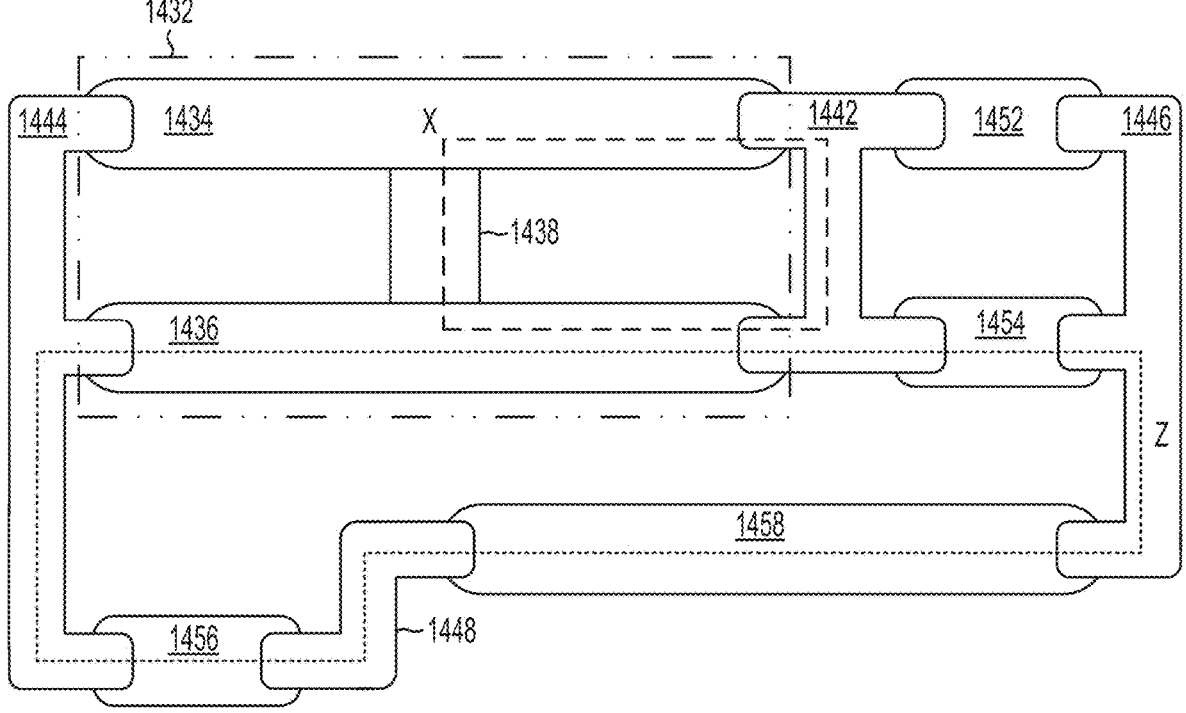
Figure 14C:
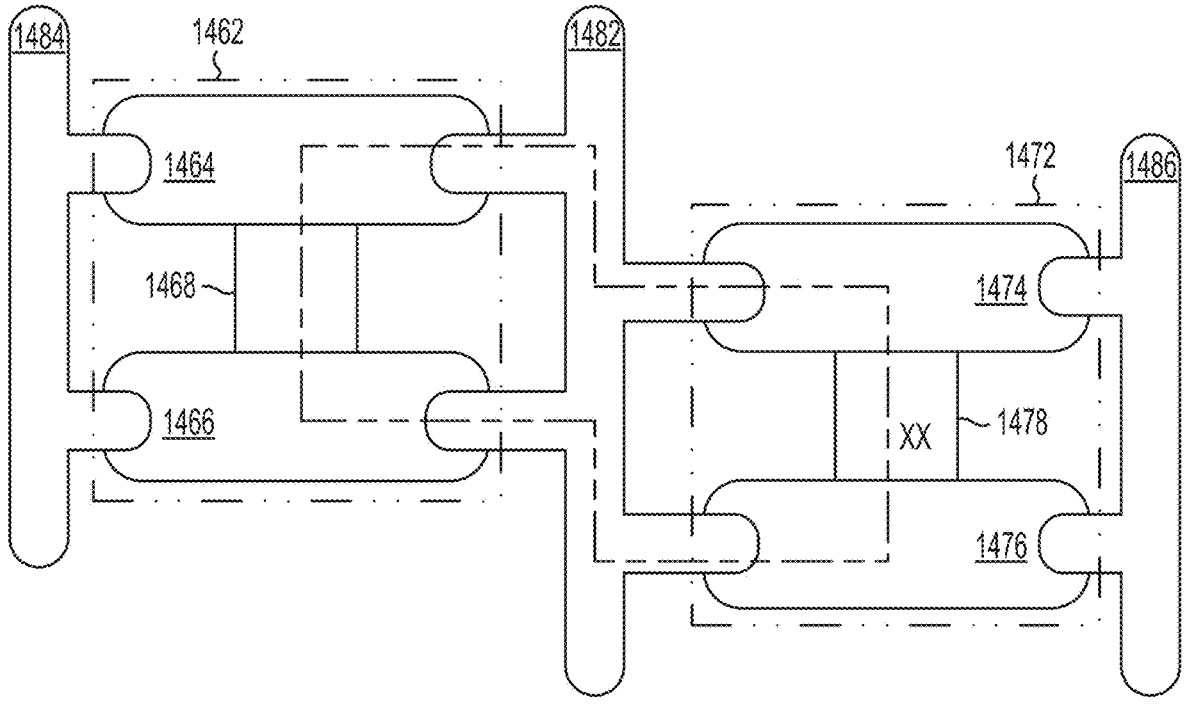

FIGS. 14A, 14B, and 14C show example qubit measurements associated with the Cairo pentagonal lattice 1300 of FIG. 13. FIG. 14A shows a tetron 1412 for enabling a qubit. The MZMs for this qubit are on the end of two different topological wires (topological wire 1414 and topological wire 1416) connected via a superconducting backbone 1418. One of the measurements is accomplished using a measurement loop (labeled as X), which extends through a portion of the semiconductor region 1424. Tetron 1412 is further coupled to semiconductor region 1422. In this example, semiconductor regions are further coupled via a coherent link 1420. Another measurement is accomplished using a measurement loop (labeled as Z), which extends through a coherent link 1420, through a portion of semiconductor region 1422, and a portion of semiconductor region 1424.

FIG. 14B shows a tetron 1432 for enabling a qubit. The MZMs for this qubit are on the end of two different topological wires (topological wire 1434 and topological wire 1436) connected via a superconducting backbone 1438. FIG. 14B shows another measurement that is accomplished using a measurement loop (labeled as X), which extends through semiconductor region 1442. FIG. 14B also shows tetron 1432 coupled to semiconductor region 1444. Tetron 1432 is further coupled to semiconductor region 1442, which is coupled to another semiconductor region 1446 via half-coherent links 1452 and 1454. Semiconductor region 1492 is also coupled to semiconductor region 1448 via a coherent link 1458. Semiconductor region 1448 is further coupled to semiconductor region 1444 via half-coherent link 1456. As shown in FIG. 14B, another measurement is accomplished using a measurement loop (labeled as Z), which extends through a portion of semiconductor region 1442, half-coherent link 1454, a portion of semiconductor region 1446, coherent link 1458, semiconductor region 1448, half-coherent link 1456, and a portion of semiconductor region 1444. Although FIGS. 14A and 14B show both X and Z measurement loops, at a given time only one of the loops is enabled since these measurements cannot intersect. As explained later, these measurements are performed across the Cairo pentagonal lattice of tetrons in a manner to prevent such intersection between measurement loops during a given step in the operation sequences.

FIG. 14C shows tetrons 1462 and 1472 for enabling a pair of qubits. Two MZMs for one of the qubits are on the end of two different topological wires (topological wire 1464 and topological wire 1466) connected via a superconducting backbone 1468. Two MZMs for the other one of the qubits are on the end of two different topological wires (topological wire 1474 and topological wire 1476) connected via a superconducting backbone 1478. A 2-qubit Pauli basis measurement is accomplished using a measurement loop (labeled XX), which extends through portions of tetrons 1462 and 1464 and a portion of a semiconductor region 1482. FIG. 14C shows other semiconductor regions 1484 and 1486 that can be coupled to other tetrons or coherent links included in the lattice. Although FIGS. 14A, 14B, and 14C show certain examples of measurements, other measurements are possible, and could be advantageous for certain purposes.

Figure 15:
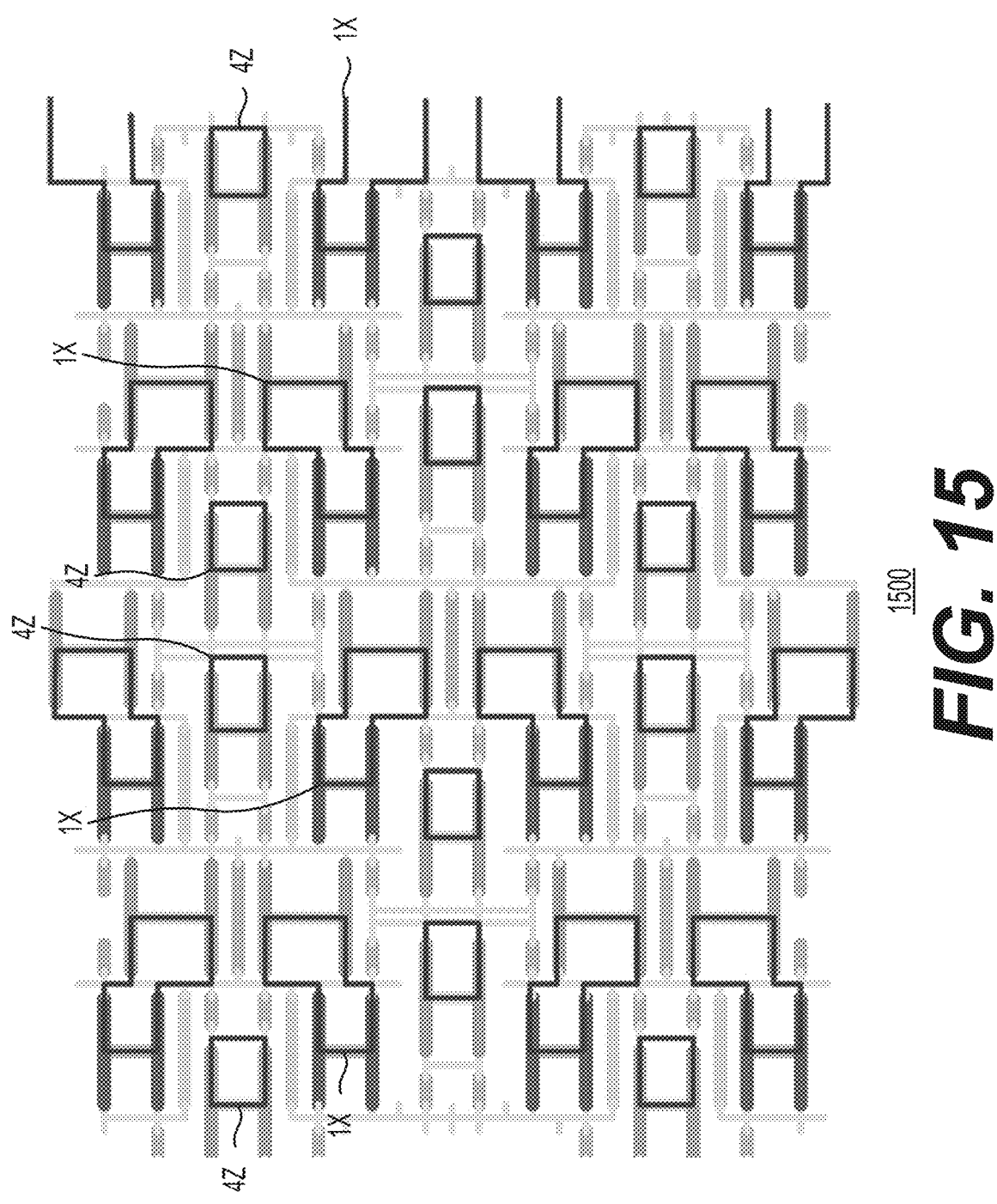
FIG. 15 is a view of the performance of step one (1X, 4Z) of the sequence of measurements associated with an error correction code using the Cairo pentagonal lattice of FIG. 13 in accordance with one example.
Figure 16:
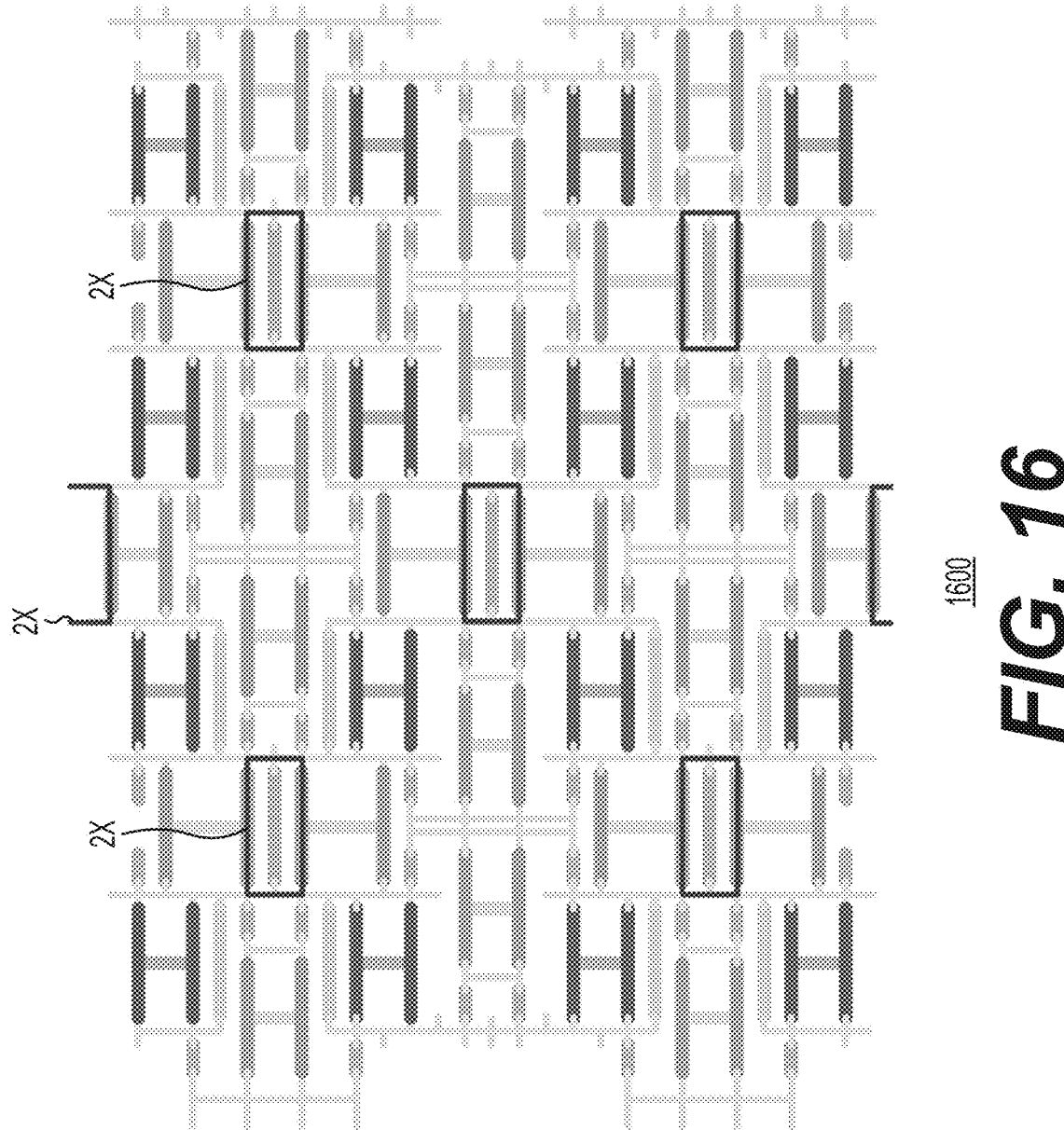
FIG. 16 is a view of the performance of step two (2X) of the sequence of measurements associated with an error correction code using the Cairo pentagonal lattice of FIG. 13 in accordance with one example.
Figure 17:
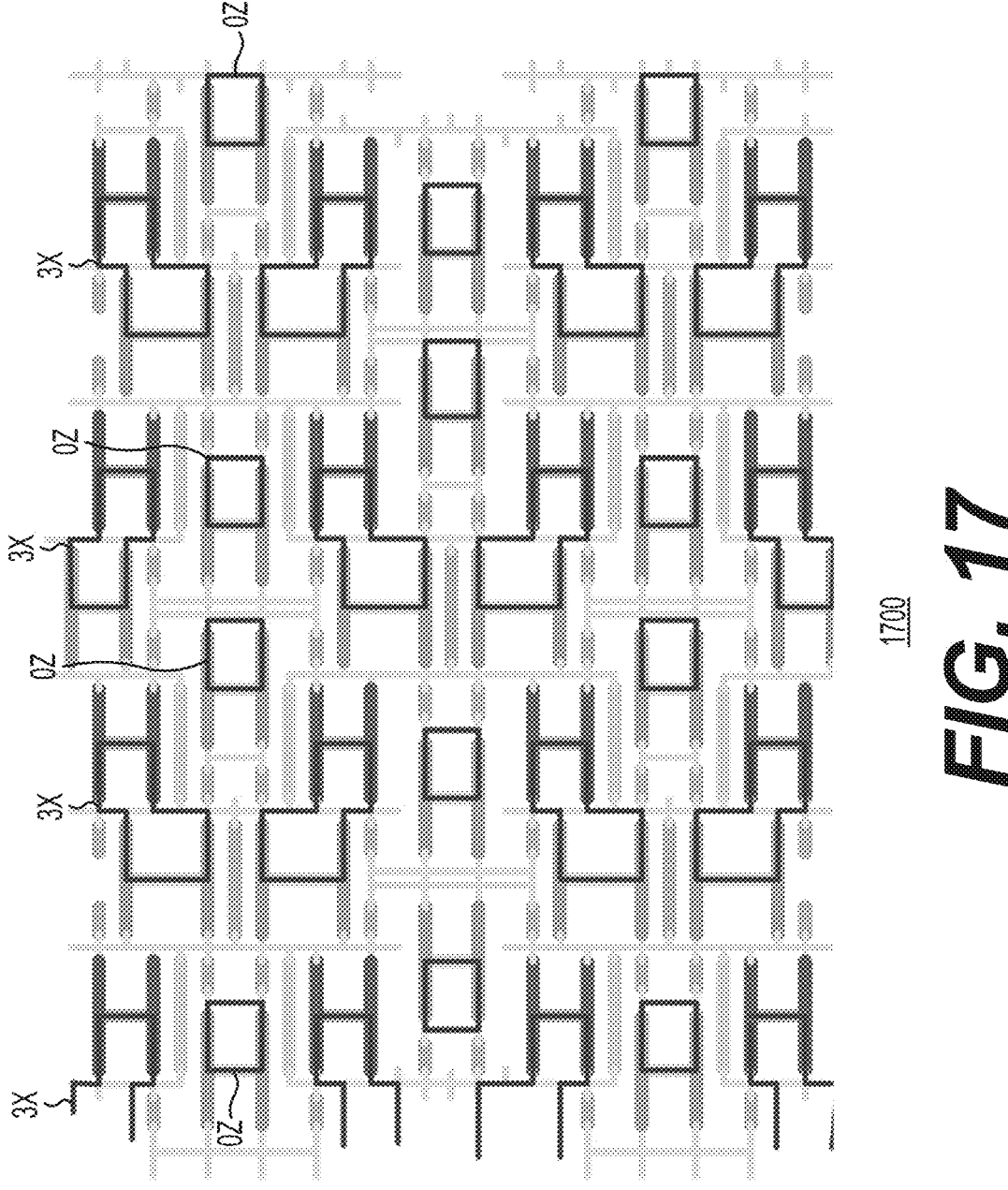
FIG. 17 is a view of the performance of step three (3X, 0Z) of the sequence of measurements associated with an error correction code using the Cairo pentagonal lattice of FIG. 13 in accordance with one example.

FIGS. 15-20 illustrate the assignment and performance of six steps in the sequence of measurements for implementing the pentagonal surface code in the example Cairo pentagonal lattice 1300 of FIG. 13. As noted earlier, an example full implementation of the surface code (repeatedly measuring the stabilizers) interleaves the $M_{XXXX}$ and $M_{ZZZZ}$ sequences to yield the following six step period: 1=(1X, 4Z), 2=2X, 3=(3X, 0Z), 4=(4X, 1Z), 5=2Z, and 6=(0X, 3Z). FIG. 15 is a view 1500 of the performance of step one (1X, 4Z) of the sequence of measurements associated with an error correction code using the Cairo pentagonal lattice 1300 of FIG. 13 in accordance with one example. In this example, the 4Z measurement is applied across the lattice in parallel as indicated in one of the rows of view 1500 of FIG. 15. At the same time, in an interleaved fashion, the 1X measurement is applied across the lattice in parallel as shown in another row of view 1500. FIG. 16 is a view 1600 of the performance of step two (2X) of the sequence of measurements associated with an error correction code using the Cairo pentagonal lattice 1300 of FIG. 13 in accordance with one example. In this example, the 2X measurement is applied across all rows in the lattice in parallel as indicated in view 1600. FIG. 17 is a view 1700 of the performance of step three (3X, 0Z) of the sequence of measurements associated with an error correction code using the Cairo pentagonal lattice 1300 of FIG. 13 in accordance with one example. In this example, the 3X measurement is applied across the lattice in parallel as indicated in one row of view 1700. At the same time, in an interleaved fashion, the 0Z measurement is applied across the lattice in parallel as shown in another row of view 1700.

Figure 18:
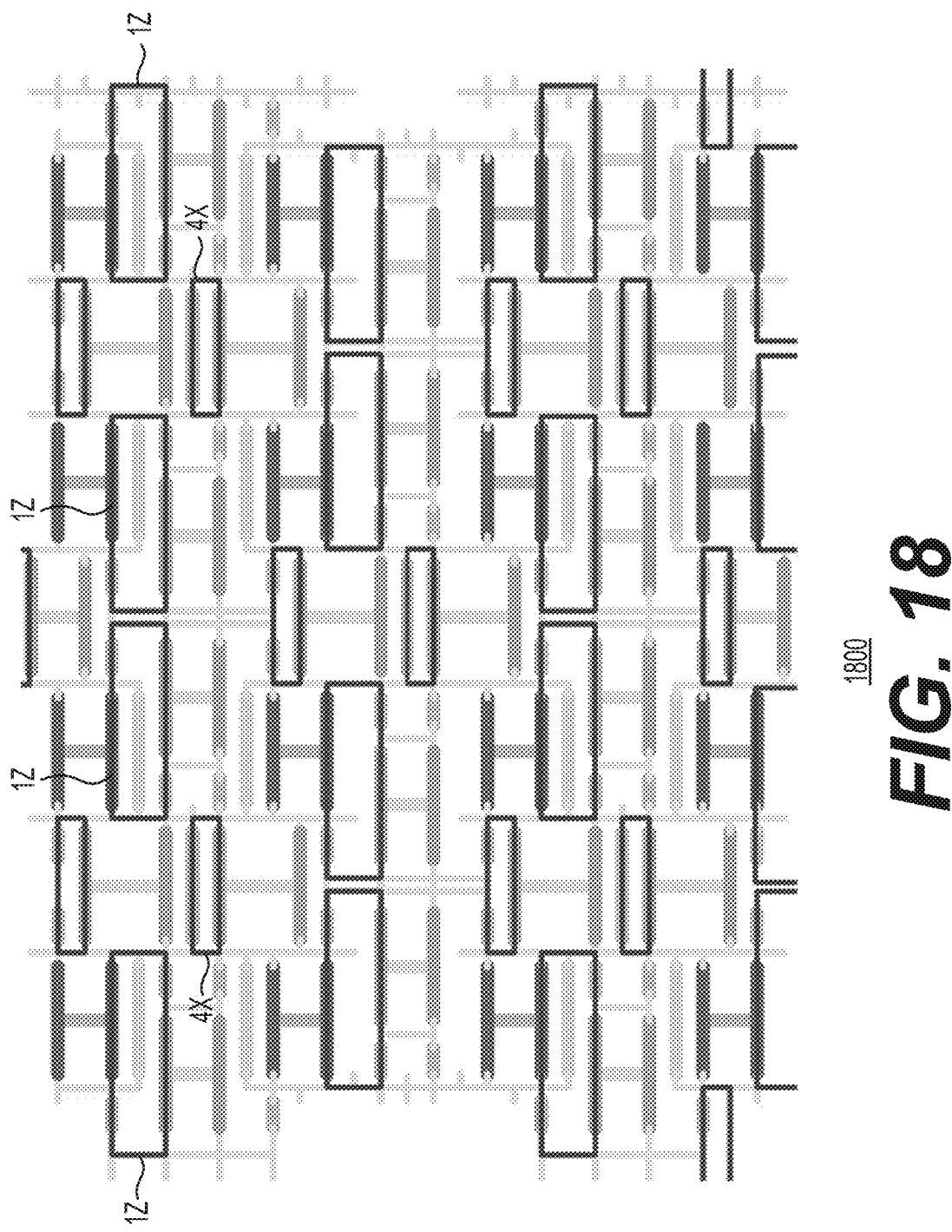
FIG. 18 is a view of the performance of step four (4X, 1Z) of the sequence of measurements associated with an error correction code using the Cairo pentagonal lattice of FIG. 13 in accordance with one example.
Figure 19:
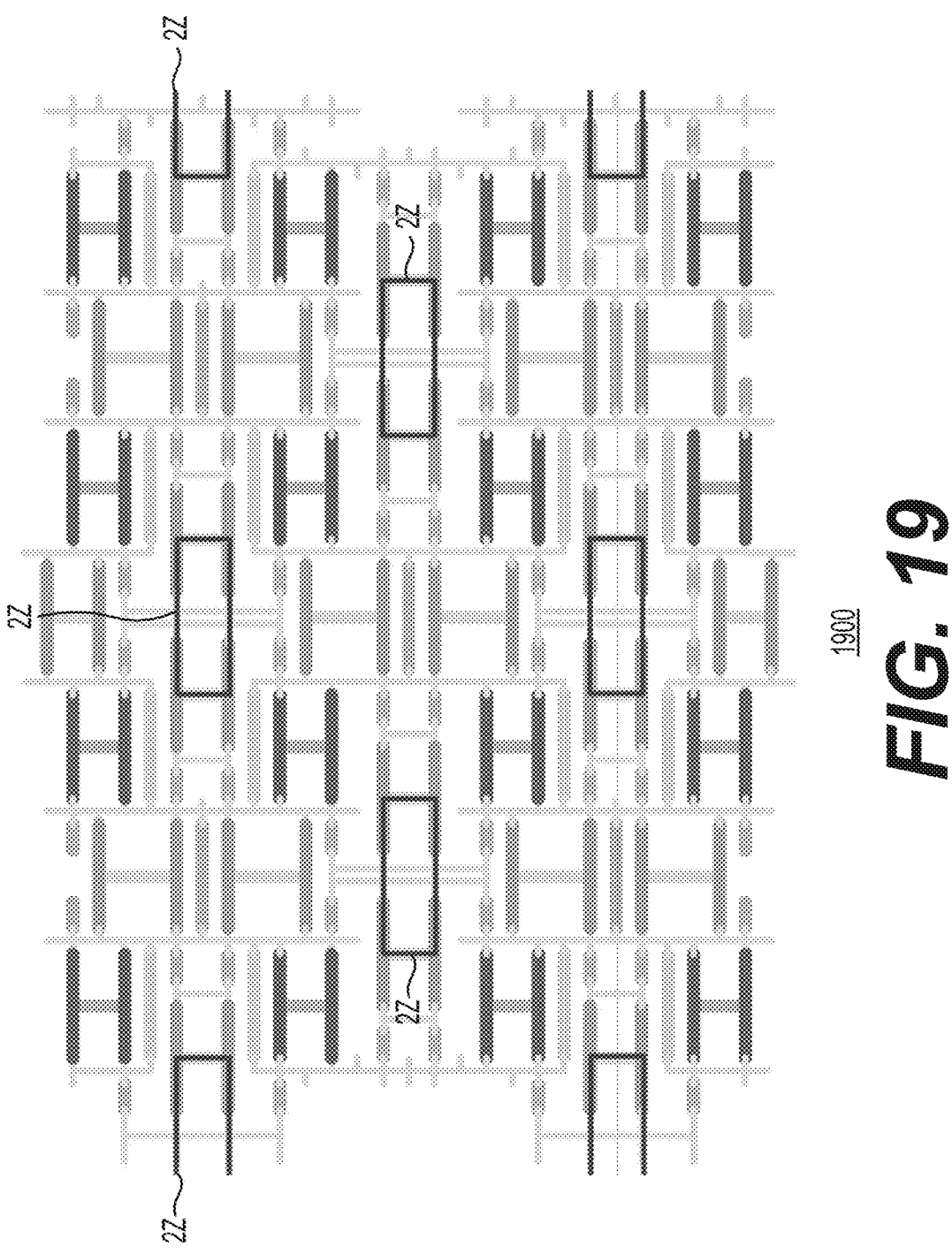
FIG. 19 is a view of the performance of step five (2Z) of the sequence of measurements associated with an error correction code using the Cairo pentagonal lattice of FIG. 13 in accordance with one example.
Figure 20:
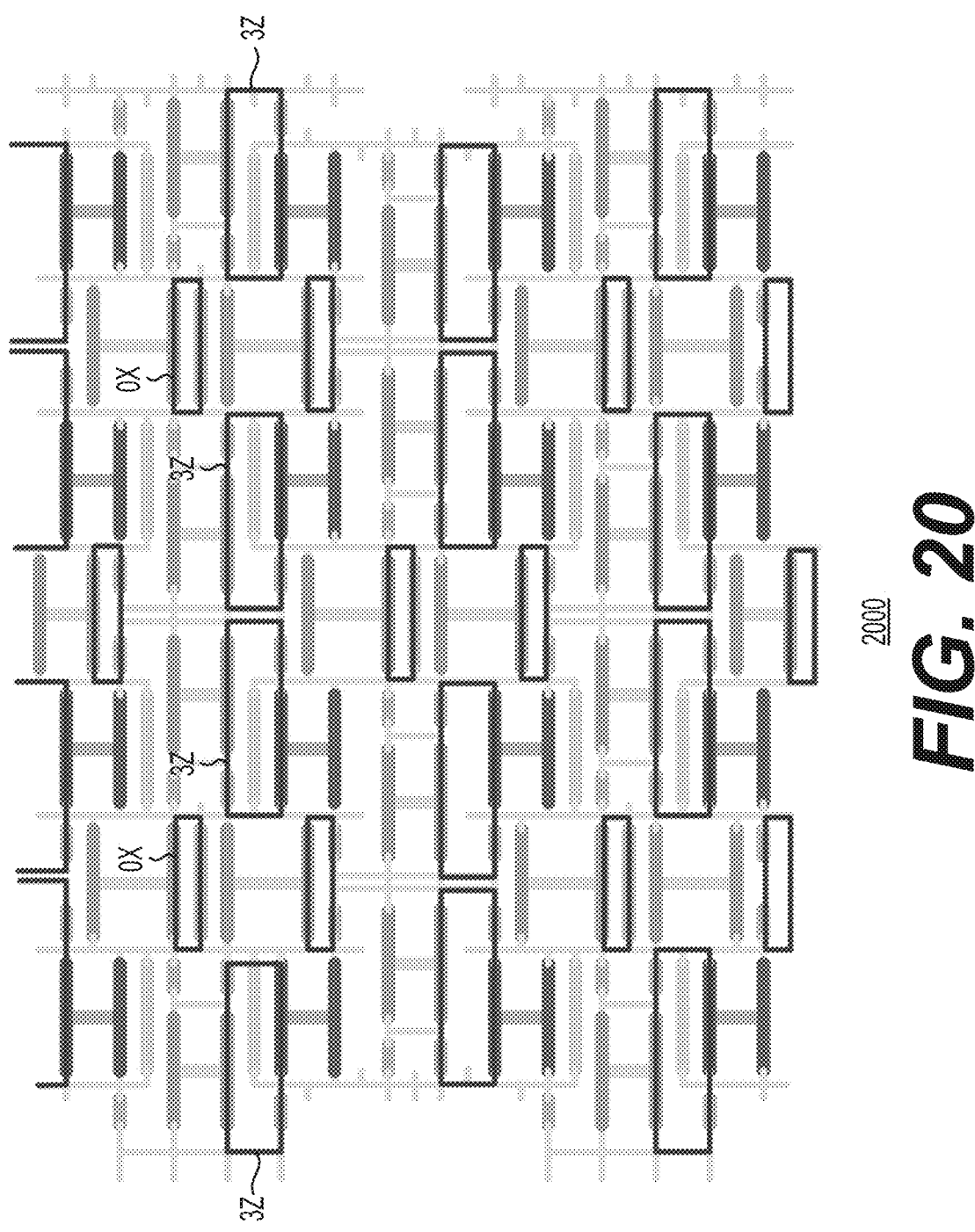
FIG. 20 is a view of the performance of step six (0X, 3Z) of the sequence of measurements associated with an error correction code using the Cairo pentagonal lattice of FIG. 13 in accordance with one example.

FIG. 18 is a view 1800 of the performance of step four (4X, 1Z) of the sequence of measurements associated with an error correction code using the Cairo pentagonal lattice 1300 of FIG. 13 in accordance with one example. In this example, the 1Z measurement is applied across the lattice in parallel as indicated in a row of view 1800. At the same time, in an interleaved fashion, the 4X measurement is applied across the lattice in parallel as shown in another row of view 1800. FIG. 19 is a view 1900 of the performance of step five (2Z) of the sequence of measurements associated with an error correction code using the Cairo pentagonal lattice 1300 of FIG. 13 in accordance with one example. In this example, the 2Z measurement is applied across the lattice in parallel as shown in view 1900. FIG. 20 is a view 2000 of the performance of step six (0X, 3Z) of the sequence of measurements associated with an error correction code using the Cairo pentagonal lattice 1300 of FIG. 13 in accordance with one example. In this example, the 0X measurement is applied across the lattice in parallel as indicated for a row of view 2000. At the same time, in an interleaved fashion, the 3Z measurement is applied across the lattice in parallel as shown for another row of view 2000. The six step period corresponding to the application of the error correcting code to Cairo pentagonal lattice 1300 is repeated again and again until other operations, such as logical operations need to be performed. The output of the error correcting codes is provided to a decoder that can be used to detect and correct the detected errors. Although FIGS. 15-20 show the performance of six steps in the sequence of measurements in a certain manner, these steps could be performed in a different manner. As an example, instead of interleaving X and Z measurements in the manner shown in FIGS. 15-20, the steps may be interleaved in a different manner.

Similar to the benefits associated with the layout of brick-walled pentagonal lattice 400 of FIG. 4, there are several benefits of using the layout of Cairo pentagonal lattice 1300 shown in FIG. 13 to implement the surface code as shown with respect to FIGS. 15-20. Such benefits include: (1) 2-qubit measurements between auxiliary tetrons and XX measurements between data and auxiliary qubits are short distance (do not require any coherent links or long semiconductor segments); (2) ZZ measurements between data and auxiliary qubits only require two "half" coherent links, which are expected to result in higher measurement visibility than 2-qubit measurements with full-length coherent links; (3) the layout only requires dual-rail semiconductors in sparse areas, simplifying fabrication compared to a layout requiring dual rail semiconductors throughout the lattice; and (4) the layout does not hard-code any boundary conditions, making it naturally suited for implementing lattice surgery for logical operations.

Figure 21:
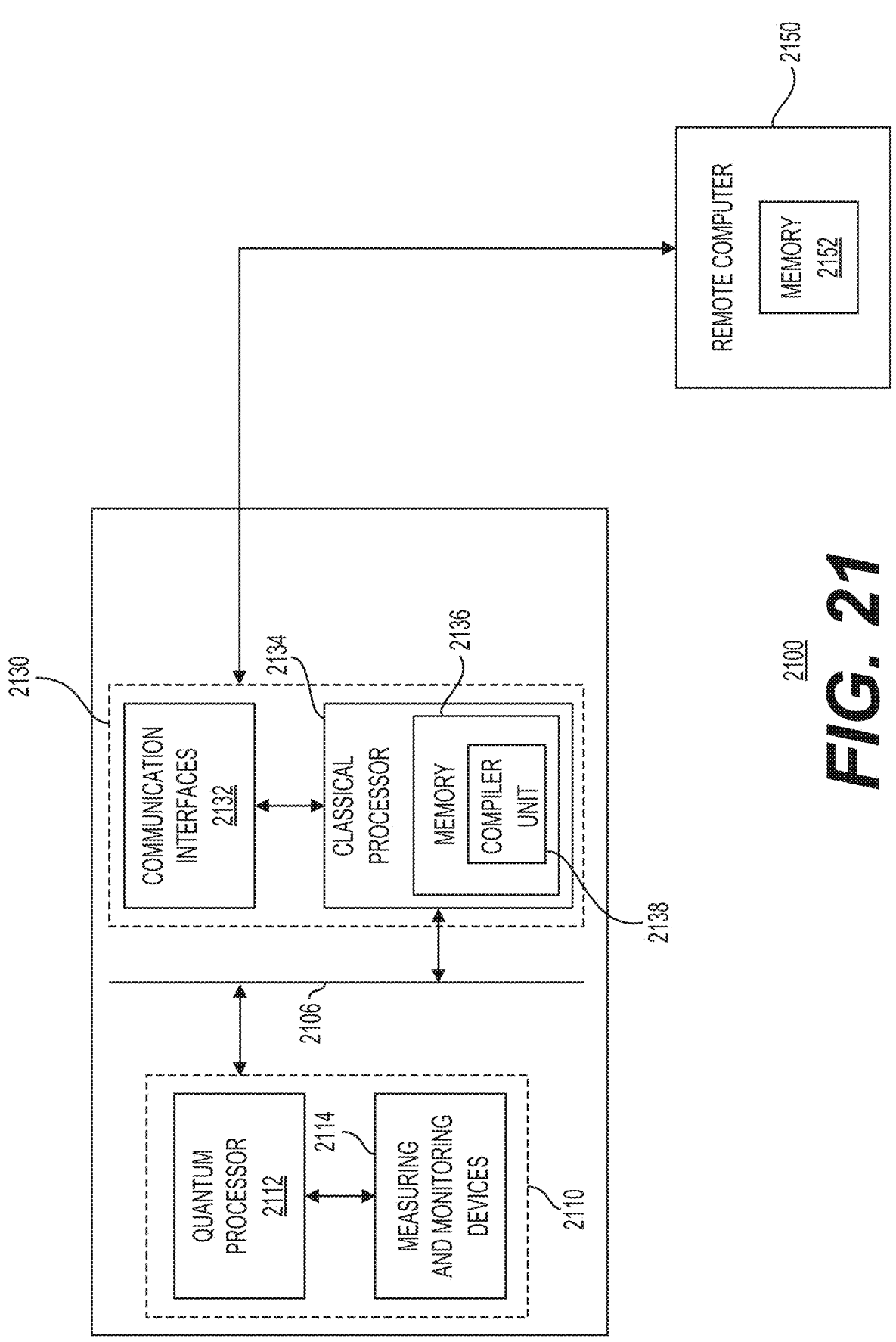
FIG. 21 shows an example system environment for implementing aspects of the technology and the methods described in the present disclosure.

FIG. 21 shows an example system environment 2100 for implementing aspects of the technology and the methods described in the present disclosure. System environment 2100 includes a quantum computing system 2110 and a classical computing system 2130, which is coupled to a remote computer 2150. Quantum computing system 2110 consumes the quantum circuits generated using the classical computing system 2130. Quantum computing system 2110 may include a quantum processor 2112 and measuring and monitoring devices 2114. In one example, quantum processor 2112 and measuring and monitoring devices 2114 may be configured to operate in a cryogenic environment (e.g., between 4 Kelvin and 77 Kelvin) such that quantum processor 2112 may perform superconducting operations. Quantum processor 2112 may execute quantum circuits that are compiled by classical computing system 2130. The compiled quantum circuits may be communicated to quantum processor 2112 via bus 2106.

With continued reference to FIG. 21, classical computing system 2130 may include communication interface(s) 2132, classical processor 2134, and memory 2136. Classical processor 2134 may include a decoder to decode the output received from classical computing system 2130, including any output generated by the performance of the steps associated with the error correcting code described earlier. Memory 2136 may include a compiler unit 2138 including libraries and other programs or code to compile a high-level description of quantum algorithms into quantum circuits. Compiler unit 2138 may further include programs or code to execute the steps described with respect to the sequence of measurements for implementing error correction code. Thus, compiler unit 2138 may include programs or code that when executed by classical processor 2134 may perform the various methods described with respect to the present disclosure. In one example, such programs or code may be stored in memory 2136 either as part of compiler unit 2138 or separately. The relevant programs and code may also be stored in memory 2152, which is associated with remote computer 2150.

In conclusion, the present disclosure relates to a quantum device comprising a set of tetrons for enabling *Majorana*-based qubits. The set of tetrons is arranged in a lattice to allow pentagonal tilings associated with the set of tetrons.

The lattice may comprise a brick-walled pentagonal lattice. Alternatively, the lattice may comprise a Cairo pentagonal lattice. The lattice is configurable to allow performance of a sequence of measurements for implementing an error correcting code.

The error correcting code may comprise a surface code. The surface code may be implemented by repeatedly performing a sequence of qubit measurements having a time period of six. The qubit measurements comprise 1-qubit and 2-qubit Pauli measurements.

The quantum device may comprise semiconductor regions, and at least a subset of the qubit measurements may include use of a measurement loop including at least a portion of at least one of the semiconductor regions. The quantum device may comprise coherent links, and at least a subset of measurements may include use of a measurement loop including at least one of the coherent links.

In another example, the present disclosure relates to a quantum device comprising a set of tetrons for enabling *Majorana*-based qubits. The set of tetrons is arranged in one of a brick-walled pentagonal lattice or a Cairo pentagonal lattice to allow pentagonal tilings associated with the set of tetrons.

The quantum device is configurable to allow performance of a sequence of measurements for implementing an error correcting code. The error correcting code may comprise a surface code. The surface code may be implemented by repeatedly performing a sequence of qubit measurements having a time period of six. The qubit measurements comprise 1-qubit and 2-qubit Pauli measurements.

The quantum device may comprise semiconductor regions, and at least a subset of the qubit measurements may include use of a measurement loop including at least a portion of at least one of the semiconductor regions. The quantum device may comprise coherent links, and at least a subset of measurements may include use of a measurement loop including at least one of the coherent links.

In yet another example, the present disclosure relates to a method for operating a quantum device comprising a set of tetrons arranged in a lattice. The method includes assigning code steps corresponding to a surface code to pentagonal tilings associated with the set of tetrons.

The lattice may comprise a brick-walled pentagonal lattice. Alternatively, the lattice may comprise a Cairo pentagonal lattice. The method may further include performing the assigned code steps for implementing the surface code by repeatedly performing a sequence of qubit measurements having a time period of six.

It is to be understood that the systems, devices, sequences, methods, and components described herein are merely examples. In an abstract, but still definite sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or inter-medial components. Likewise, any two components so associated can also be viewed as being "operably connected," or "coupled," to each other to achieve the desired functionality. Merely because a component, which may be an apparatus, a structure, a device, a system, or any other implementation of a functionality, is described herein as being coupled to another component does not mean that the components are necessarily separate components. As an example, a component A described as being coupled to another component B may be a sub-component of the component B, the component B may be a sub-component of the component A, or components A and B may be a combined sub-component of another component C.

Furthermore, those skilled in the art will recognize that boundaries between the functionality of the above described operations are merely illustrative. The functionality of multiple operations may be combined into a single operation, and/or the functionality of a single operation may be distributed in additional operations. Moreover, alternative embodiments may include multiple instances of a particular operation, and the order of operations may be altered in various other embodiments.

Although the disclosure provides specific examples, various modifications and changes can be made without departing from the scope of the disclosure as set forth in the claims below. Accordingly, the specification and figures are to be regarded in an illustrative rather than a restrictive sense, and all such modifications are intended to be included within the scope of the present disclosure. Any benefits, advantages, or solutions to problems that are described herein with regard to a specific example are not intended to be construed as a critical, required, or essential feature or element of any or all the claims.

Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles.

Unless stated otherwise, terms such as "first" and "second" are used to arbitrarily distinguish between the elements such terms describe. Thus, these terms are not necessarily intended to indicate temporal or other prioritization of such elements.

What is claimed:

1. A quantum device comprising:
a set of tetrons for enabling *Majorana*-based qubits, wherein the set of tetrons is arranged in a lattice of only tetron qubits to allow pentagonal tilings associated with the set of tetrons, wherein the lattice is configurable to allow performance of a sequence of measurements for implementing an error correcting code, wherein the error correcting code comprises a surface code, wherein the surface code is implemented by repeatedly performing a sequence of qubit measurements having a time period of six, wherein the quantum device comprises semiconductor regions, and wherein at least a subset of the qubit measurements includes use of a measurement loop comprising at least a portion of at least one of the semiconductor regions.

2. The quantum device of claim 1, wherein the lattice comprises a brick-walled pentagonal lattice.

3. The quantum device of claim 1, wherein the qubit measurements comprise 1-qubit and 2-qubit Pauli measurements.

4. The quantum device of claim 3, wherein the quantum device comprises coherent links, and wherein at least a subset of the qubit measurements includes use of a measurement loop including at least one of the coherent links.

5. The quantum device of claim 1, wherein the lattice is configurable to allow performance of a first step of the sequence of qubit measurements comprising two qubit measurements applied across the lattice.

6. The quantum device of claim 5, wherein the lattice is configurable to allow performance of a second step of the qubit measurements comprising a single qubit measurement applied across the lattice.

7. The quantum device of claim 6, wherein the lattice is configurable to allow performance of a third step of the sequence of qubit measurements comprising two qubit measurements applied across the lattice.

8. The quantum device of claim 7, wherein the lattice is configurable to allow performance of a fourth step of the sequence of qubit measurements comprising two qubit measurements applied across the lattice.

9. The quantum device of claim 8, wherein the lattice is configurable to allow performance of a fifth step of the qubit measurements comprising a single qubit measurement applied across the lattice.

10. The quantum device of claim 9, wherein the lattice is configurable to allow performance of a sixth step of the sequence of qubit measurements comprising two qubit measurements applied across the lattice.

11. The quantum device of claim 1, wherein each of the set of tetrons comprises a *Majorana*-based qubit built out of two topological wires connected by a superconducting backbone.

12. A quantum device comprising:

a set of tetrons for enabling *Majorana*-based qubits, wherein the set of tetrons is arranged in a brick-walled pentagonal lattice to allow pentagonal tilings associated with the set of tetrons, wherein the quantum device is configurable to allow performance of a sequence of measurements for implementing an error correcting code, wherein the error correcting code comprises a surface code wherein the surface code is implemented by repeatedly performing a sequence of qubit measurements having a time period of six, wherein the quantum device comprises semiconductor regions, and wherein at least a subset of the qubit measurements includes use of a measurement loop comprising at least a portion of at least one of the semiconductor regions.

13. The quantum device of claim 12, wherein the qubit measurements comprise 1-qubit and 2-qubit Pauli measurements.

14. The quantum device of claim 12, wherein the quantum device comprises coherent links, and wherein at least a subset of the qubit measurements includes use of a measurement loop including at least one of the coherent links.

15. The quantum device of claim 12, wherein each of the set of tetrons comprises a *Majorana*-based qubit built out of two topological wires connected by a superconducting backbone.

16. A method for operating a quantum device comprising a set of tetrons arranged in a lattice of only tetron qubits to allow pentagonal tilings associated with the set of tetrons, wherein the lattice is configurable to allow performance of a sequence of qubit measurements for implementing an error correcting code, wherein the error correcting code comprises a surface code, wherein the quantum device comprises semiconductor regions, the method comprising:

assigning code steps corresponding to the surface code to the pentagonal tilings associated with the set of tetrons; and performing the assigned code steps for implementing the surface code by repeatedly performing a sequence of qubit measurements having a time period of six, wherein at least a subset of the qubit measurements includes use of a measurement loop comprising at least a portion of at least one of the semiconductor regions.

17. The method of claim 16, wherein the lattice comprises a brick-walled pentagonal lattice.

18. The method of claim 16, wherein the qubit measurements comprise 1-qubit and 2-qubit Pauli measurements.

19. The method of claim 16, wherein the quantum device comprises coherent links, and wherein at least a subset of the qubit measurements includes use of a measurement loop comprising at least one of the coherent links.

20. The method of claim 16, wherein each of the set of tetrons comprises a *Majorana*-based qubit built out of two topological wires connected by a superconducting backbone.

* * * * *